United States Patent
Hui et al.

(10) Patent No.: US 10,827,668 B2
(45) Date of Patent: *Nov. 10, 2020

(54) AIR DISTRIBUTION SYSTEM FOR A PNEUMATIC CONVEYING SYSTEM

(71) Applicant: CNH Industrial Canada, Ltd., Saskatoon (CA)

(72) Inventors: Ka Po Catherine Hui, Saskatoon (CA); Martin J. Roberge, Saskatoon (CA); Dennis George Thompson, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/427,976

(22) Filed: May 31, 2019

(65) Prior Publication Data

US 2019/0281757 A1  Sep. 19, 2019

Related U.S. Application Data

(63) Continuation of application No. 14/932,250, filed on Nov. 4, 2015, now Pat. No. 10,306,825.

(60) Provisional application No. 62/206,225, filed on Aug. 17, 2015, provisional application No. 62/075,114, filed on Nov. 4, 2014.

(51) Int. Cl.
*A01C 7/08* (2006.01)

(52) U.S. Cl.
CPC .................. *A01C 7/082* (2013.01)

(58) Field of Classification Search
CPC ......... A01C 7/082; A01C 7/081; A01C 7/084; A01C 7/88; A01C 5/04; B65G 53/34
See application file for complete search history.

(56) References Cited

U.S. PATENT DOCUMENTS

| | | | |
|---|---|---|---|
| 1,850,937 A | 3/1932 | Messinger |
| 1,871,853 A | 4/1932 | Kennedy |
| 2,171,205 A | 8/1939 | Zinke |
| 2,657,702 A | 11/1953 | Weisenbach |
| 2,736,489 A | 2/1956 | Bopf |
| 3,265,442 A | 8/1966 | Willis, Jr. et al. |
| 3,267,891 A | 8/1966 | Hemker |
| 3,864,938 A | 2/1975 | Hayes, Jr. |
| 3,944,261 A | 3/1976 | Reed et al. |
| 4,140,178 A | 2/1979 | Ohiswager et al. |

(Continued)

OTHER PUBLICATIONS

John Deere—Parts Catalog, Stationary Double Shoot Manifold Tube Assembly, 2 pgs, printed Apr. 17, 2012.

(Continued)

*Primary Examiner* — Lee A Holly
(74) *Attorney, Agent, or Firm* — Rebecca L. Henkel; Rickard K. DeMille

(57) ABSTRACT

A system for pressurizing a tank of an agricultural air distribution system includes an air source configured to supply pressurized air and a plenum having an inlet fluidly coupled to the air source and configured to receive a flow of pressurized air. The plenum includes a face element positioned opposite from the inlet relative to a direction of flow of the pressurized air through the plenum. Moreover, the face element includes a pressurization port configured to direct the flow of pressurized air to the tank and at least one outlet port configured to couple to at least one hose to supply the pressurized air to an agricultural implement.

20 Claims, 12 Drawing Sheets

(56) References Cited

U.S. PATENT DOCUMENTS

| | | | |
|---|---|---|---|
| 4,481,975 A | 11/1984 | Buckley | |
| 4,528,919 A | 7/1985 | Harbolt et al. | |
| 4,549,567 A | 10/1985 | Horton | |
| 4,717,289 A | 1/1988 | Popowich et al. | |
| 5,101,847 A | 4/1992 | Orbie | |
| 5,156,642 A | 10/1992 | Lopez | |
| 5,226,213 A | 7/1993 | Lewis et al. | |
| 5,241,867 A | 9/1993 | Cohen et al. | |
| 5,934,205 A | 8/1999 | Gordon et al. | |
| 5,979,343 A | 11/1999 | Gregor et al. | |
| 5,996,516 A | 12/1999 | Benneweis et al. | |
| 6,192,813 B1 | 2/2001 | Memory et al. | |
| 6,210,109 B1 | 4/2001 | Will et al. | |
| 6,213,690 B1 | 4/2001 | Gregor et al. | |
| 6,220,793 B1 | 4/2001 | Meyer | |
| 6,289,679 B1 | 9/2001 | Tunkel et al. | |
| 6,516,810 B1 | 2/2003 | Haul | |
| 6,672,627 B1 | 1/2004 | Mariman et al. | |
| 6,811,358 B2 | 11/2004 | Bauver et al. | |
| 7,014,392 B2 | 3/2006 | Duwe et al. | |
| 7,162,962 B2 | 1/2007 | Fuessel et al. | |
| 7,290,566 B1 | 11/2007 | Young et al. | |
| 7,785,043 B2 | 8/2010 | Elsen | |
| 8,001,994 B2 | 8/2011 | Miller et al. | |
| 8,151,885 B2 | 4/2012 | Bull et al. | |
| 8,403,602 B2 | 3/2013 | Zarnescu | |
| 8,931,509 B2 | 1/2015 | Beard | |
| D755,728 S | 5/2016 | Smith | |
| D782,543 S | 3/2017 | Hui et al. | |
| D783,058 S | 4/2017 | Hui et al. | |
| D784,421 S | 4/2017 | Hui et al. | |
| 9,629,303 B2 | 4/2017 | Roberge et al. | |
| 9,681,600 B2 | 6/2017 | Henry et al. | |
| 9,902,571 B2 | 2/2018 | Hui et al. | |
| 9,969,569 B2 | 5/2018 | Borkgren | |
| 10,143,129 B2 | 12/2018 | Roberge et al. | |
| 10,178,180 B2 | 1/2019 | Roberge et al. | |
| 10,306,825 B2 | 6/2019 | Hui et al. | |
| 10,421,623 B2 | 9/2019 | Hui et al. | |
| 2003/0161694 A1 | 8/2003 | Bauver et al. | |
| 2008/0276998 A1 | 11/2008 | Boyher et al. | |
| 2009/0242047 A1 | 10/2009 | Hilton et al. | |
| 2010/0065140 A1 | 3/2010 | Joynson et al. | |
| 2011/0253233 A1 | 10/2011 | Hillier et al. | |
| 2011/0311322 A1 | 12/2011 | Jost et al. | |
| 2011/0315256 A1 | 12/2011 | Petersen et al. | |
| 2012/0186501 A1 | 7/2012 | Zarnescu et al. | |
| 2012/0237304 A1 | 9/2012 | Zarnescu | |
| 2012/0301231 A1 | 11/2012 | Jagow et al. | |
| 2013/0211628 A1 | 8/2013 | Thurow et al. | |
| 2014/0056701 A1 | 2/2014 | Caplan et al. | |
| 2015/0246773 A1 | 9/2015 | Sundholm | |
| 2015/0298919 A1 | 10/2015 | Le | |
| 2016/0081262 A1 | 3/2016 | Roberge et al. | |
| 2016/0120098 A1 | 5/2016 | Hui et al. | |
| 2017/0089000 A1 | 3/2017 | Sang | |
| 2017/0172060 A1 | 6/2017 | Roberge et al. | |
| 2018/0134503 A1 | 5/2018 | Hui et al. | |
| 2018/0134504 A1 | 5/2018 | Hui et al. | |
| 2018/0134505 A1 | 5/2018 | Hui et al. | |
| 2019/0239424 A1 | 8/2019 | Hui et al. | |

OTHER PUBLICATIONS

John Deere Seeding Group, AirPower 2, Jan. 8, 2016.
John Deere—Parts Catalog, Dual Fan Plenum and Manifold to Plenum Flex Lines (430 TBT) (430/550 TBH), 3 pgs, Jan. 11, 2016.
U.S. Appl. No. 16/690,941, filed Nov. 21, 2019, Hui et al.
U.S. Appl. No. 16/739,377, filed Jan. 10, 2020, Hui et al.
U.S. Appl. No. 62/206,225, filed Aug. 17, 2015, Hui et al.

AIR DISTRIBUTION SYSTEM FOR A PNEUMATIC CONVEYING SYSTEM

CROSS-REFERENCE TO RELATED APPLICATIONS

This application is a continuation of U.S. patent application Ser. No. 14/932,250, entitled "AIR DISTRIBUTION SYSTEM FOR A PNEUMATIC CONVEYING SYSTEM", filed Nov. 4, 2015, which claims priority from and the benefit of U.S. Provisional Application Ser. No. 62/075,114, entitled "AIR DISTRIBUTION SYSTEM FOR A PNEUMATIC CONVEYING SYSTEM", filed Nov. 4, 2014, and U.S. Provisional Application Ser. No. 62/206,225, entitled "AIR DISTRIBUTION SYSTEM FOR A PNEUMATIC CONVEYING SYSTEM", filed Aug. 17, 2015. Each of the foregoing applications is incorporated by reference in its entirety.

BACKGROUND

The present disclosure relates generally to agricultural implements and, more particularly, to supplying air to storage tanks and ground engaging opener assemblies on agricultural implements.

Generally, agricultural implements are towed behind an off-road work vehicle, such as a tractor. These agricultural implements typically include multiple rows of ground engaging opener assemblies to excavate trenches into soil for depositing a granular product, such as seeds or fertilizer. In this manner, rows of the granular product may be deposited into the soil. More specifically, the granular product may be stored in a central location, such as in storage tanks of an air cart, and distributed to each of the ground engaging opener assemblies for deposition into the soil. However, the flow of granular product from the air cart is often uneven, resulting in uneven deposition and potential plugging of distribution hoses.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system for pressurizing a tank of an agricultural air distribution system includes a plenum having an inlet configured to fluidly couple to an air source and to receive a flow of pressurized air from the air source. The plenum includes a face element positioned opposite from the inlet relative to a direction of flow of the pressurized air through the plenum. The plenum also includes a pressurization port extending from the face element and configured to direct the flow of the pressurized air to the tank. In addition, the plenum includes at least one outlet port extending from the face element and configured to couple to at least one hose to supply the pressurized air to an agricultural implement.

In another embodiment, a system for distributing air to an agricultural implement includes an air source configured to supply a flow of pressurized air and a tank configured to store an agricultural product for distribution by the agricultural implement. In certain embodiments, the tank includes a meter configured to regulate the flow of agricultural product from the tank. The system also includes a plenum fluidly coupled to the air source and configured to direct the flow of pressurized air to hoses and to the tank via a pressurization line. The plenum includes a first side coupled to a top element and a bottom element, the top element being opposite the bottom element, and a second side, opposite the first side, coupled to the top element and the bottom element. The plenum also includes an inlet positioned at a first end and configured to receive the flow of pressurized air from the air source, and a face element positioned at a second end, opposite the first end. Moreover, the plenum includes a pressurization port extending from the face element and configured to couple to the pressurization line, and multiple outlet ports extending from the face element and configured to couple to the hoses.

In another embodiment, a method of manufacturing a plenum for distributing a flow of air from an air source is disclosed. The method includes flowing a material into a mold cavity to form a body and a baffle assembly of the plenum such that the body and the baffle assembly are integrally formed from the material. The body includes an inlet positioned at a first end of the body and configured receive the flow of air from the air source, and a first side coupled to a top element and a bottom element. The top element is opposite the bottom element. The body also includes a second side, opposite the first side, coupled to the top element and the bottom element. Additionally, the body includes a face element disposed on a second end of the body, opposite the first end. The face element is configured to support at least one outlet port configured to direct the flow of air out of the plenum. Also, the baffle assembly is disposed within the body and configured to control the flow of air through the plenum.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
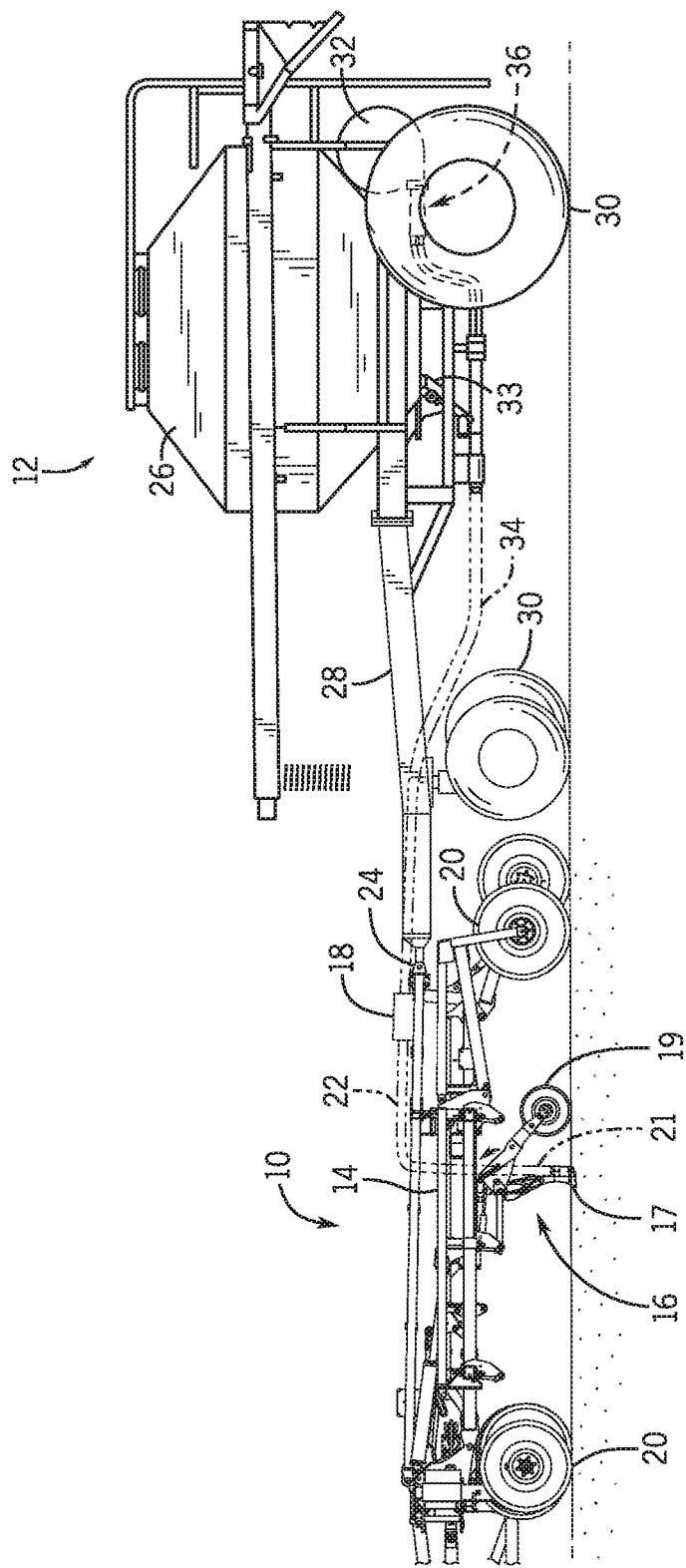
FIG. 1 is a side view of an agricultural implement with an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain agricultural implements may distribute a granular product (e.g., seeds or fertilizer) from a centralized location to multiple rows of ground engaging opener assemblies. Additionally, each of the ground engaging opener assemblies may engage the ground to excavate a trench, in which the received granular product is deposited. In this manner, rows of the granular product may be deposited into the ground. The granular product may be any suitable particulate material that is desired to be deposited into the ground, such as various types of seeds and fertilizers. However, to simplify the following discussion, the product will be described as seeds. Nevertheless, one or ordinary skill in the art would recognize that the techniques described herein may be easily adapted for use with other products.

Generally, each of the ground engaging opener assemblies may not include adjustable control over the deposition of seeds. Instead, a ground engaging opener assembly may pneumatically receive seeds via a pneumatic hose. The ground engaging opener assembly may then utilize gravity to drop received seeds into a trench. In other words, the ground engaging opener assembly may deposit seeds based on fixed parameters, such as the size of the hose and/or the flow rate of seeds to the ground engaging opener assembly, among other factors. However, in certain embodiments, the ground engaging opener assemblies may include adjustable control over the deposition of seeds (e.g., planters).

Generally, the seeds may be stored in a centralized location, such as in storage tanks of an air cart, before being distributed to each of the ground engaging opener assemblies. In certain embodiments, the centralized location is pressurized (e.g., via the pneumatic hose). It may be possible to control (e.g., meter) the seed distribution from the centralized location. However, when multiple ground engaging opener assemblies are utilized, seeds may not be equally distributed and potential plugging may occur.

Additionally, it may be desirable to deposit seeds using only a portion of the ground engaging units. For example, due to a generally fixed size of the agricultural implement, a portion of the ground under the agricultural implement may have been previously seeded or may be otherwise undesirable to seed. In such instances, it may be desirable to enable sectional control across the agricultural implement by enabling a portion of the ground engaging opener assemblies to deposit seeds while disabling another portion of the ground engaging opener assemblies. However, when seed flow to certain ground engages assemblies is disabled, air flow through the pneumatic hoses that supply the disabled ground engages assemblies may increase due to the reduced resistance associated with termination of the seed flow through the hoses. The increased air flow through the hoses may reduce the air flow into the tank, thereby reducing the pressure within the tank. As a result, the accuracy of seed metering into the pneumatic hoses may be reduced.

Accordingly, as will be described in more detail below, a system for supplying air to an agricultural implement and a seed tank is disclosed. For example, a plenum is coupled to an air source and configured to direct the air from the air source toward the agricultural implement. The plenum includes outlet ports configured to couple to hoses that distribute the air to the agricultural implement. Additionally, the plenum includes a pressurization port configured to supply pressurized air to the tank. In certain embodiments, the plenum includes a baffle assembly disposed within the plenum and configured to regulate the air flow through the plenum. For example, the baffle assembly may be configured to establish different pressures at the outlet ports while maintaining a desired air flow rate through each of the outlet ports. As a result, the hoses may receive the air flow at different pressures to compensate for line losses associated with varying lengths of the hoses. Moreover, the tank may receive a dedicated flow of air to maintain pressurization of the tank, thereby facilitating sectional control while maintaining a desired tank pressure.

To help illustrate, a side view of an agricultural implement 10 coupled to an air cart 12 is shown in FIG. 1. As depicted, the agricultural implement 10 includes a tool frame 14 coupled to a ground engaging opener assembly 16, a header 18, and wheel assemblies 20.

The agricultural implement may be pulled by an off-road work vehicle (e.g., a tractor) to deposit rows of product. Accordingly, the wheel assemblies 20 may contact the soil surface to enable the agricultural implement 10 to be pulled by the off-road work vehicle. As the agricultural implement 10 is pulled, a row of product may be deposited into the soil by the ground engaging opener assembly 16. Although only one ground engaging opener assembly 16 is shown, the agricultural implement 10 may include multiple ground engaging opener assemblies 16 organized in a row across the agricultural implement 10. In some embodiments, the agricultural implement 10 may include a row of 12, 14, 16, 18, 20, or more ground engaging opener assemblies 16, which may each deposit a row of seeds.

To facilitate depositing seeds, each ground engaging opener assembly 16 includes an opener 17, a press wheel 19, and a seed tube 21. More specifically, when the opener 17 engages the soil, the opener 17 may exert a downward force that excavates a trench into the soil as the ground engaging opener assembly 16 travels through the field. Seeds may then be deposited into the excavated trench via the seed tube 21. Then, the press wheel 19 may pack soil onto the seeds.

As described above, the deposition of seeds by the ground engaging opener assembly 16 may be controlled by the distribution of seeds from the header 18. In some embodiments, the header 18 may pneumatically distribute the seeds from a primary line to a second line. For example, a primary hose 34 may direct seeds from the air cart 12 to the header 18. Additionally, the header 18 may distribute the seeds to the ground engaging opener assembly 16 via a secondary hose 22. In certain embodiments, multiple hoses 34 may direct seeds to the multiple headers 18. Moreover, multiple hoses 22 may be coupled to multiple opener assemblies 16.

In the depicted embodiment, the air cart 12 is towed behind the agricultural implement 10. More specifically, the agricultural implement 10 may be coupled to the off-road work vehicle by a first hitch assembly (not shown), and the air cart 12 may be coupled to the agricultural implement 10 by a second hitch assembly 24. However, in other embodiments, the agricultural implement 10 may be towed behind the air cart 12. In further embodiments, the implement 10 and the air cart 12 may be part of a single unit that is towed behind an off-road work vehicle or may be elements of a self-propelled vehicle.

As described above, the air cart 12 may centrally store seeds and distribute the seeds to the headers 18. Accordingly, as depicted, the air cart 12 includes a storage tank 26, a frame 28, wheels 30, and an air source 32. More specifically, the towing hitch 24 is coupled between the tool frame 14 and the air cart frame 28, which enables the air cart 12 to be towed with the agricultural implement 10.

Additionally, the storage tank 26 may centrally store the product. In some embodiments, the storage tank 26 may include multiple compartments for storing different types of product. For example, a first compartment may store seeds while a second compartment may store a dry fertilizer. In such configurations, the air cart 12 may deliver both seed and fertilizer to the implement 10 via separate distribution systems, or as a mixture through a single distribution system.

From the storage tank 26, the product (e.g., seeds) may be fed into a pneumatic distribution system 33 (e.g., a pneumatic metering system, a metering system), which pneumatically distributes the seeds to the headers 18 via respective hoses 34. As depicted, the pneumatic distribution system 33 is mounted to the bottom of the storage tank 26. To facilitate distributing seeds, an air stream generated by the air source 32 is guided though the pneumatic distribution system 33 via a plenum 36. In some embodiments, the air source 32 may be a pump or blower powered by an electric or hydraulic motor, for example.

In certain embodiments (e.g., embodiments in which the air cart is towed behind the implement), the air source and/or the plenum may be mounted to a rear portion of the air cart (e.g., relative to a direction of travel). In other embodiments (e.g., embodiments in which the air cart is towed in front of the implement), the air source and/or the plenum may be mounted to a front portion of the air cart (e.g., relative to the direction of travel). Furthermore, in embodiments in which the air cart includes multiple distribution systems, multiple air sources and/or plenums may be utilized. For example, if the air cart includes two separate distribution systems for separately distributing seeds and fertilizer to the opener assemblies, the air cart may include two air sources and two plenums (e.g., one air source and one plenum for each distribution system). In embodiments in which the air cart includes a single distribution system (e.g., in which one or more products are metered from one or more metering systems into pneumatic hoses), a single air source and/or a single plenum may be utilized. In certain embodiments, multiple air sources and/or multiple plenums may provide an air flow to multiple groups of hoses (e.g., one group of hoses coupled to each plenum). In such embodiments, corresponding hoses from each group may merge in the metering system, thereby establishing a combined flow to the implement.

Figure 2:
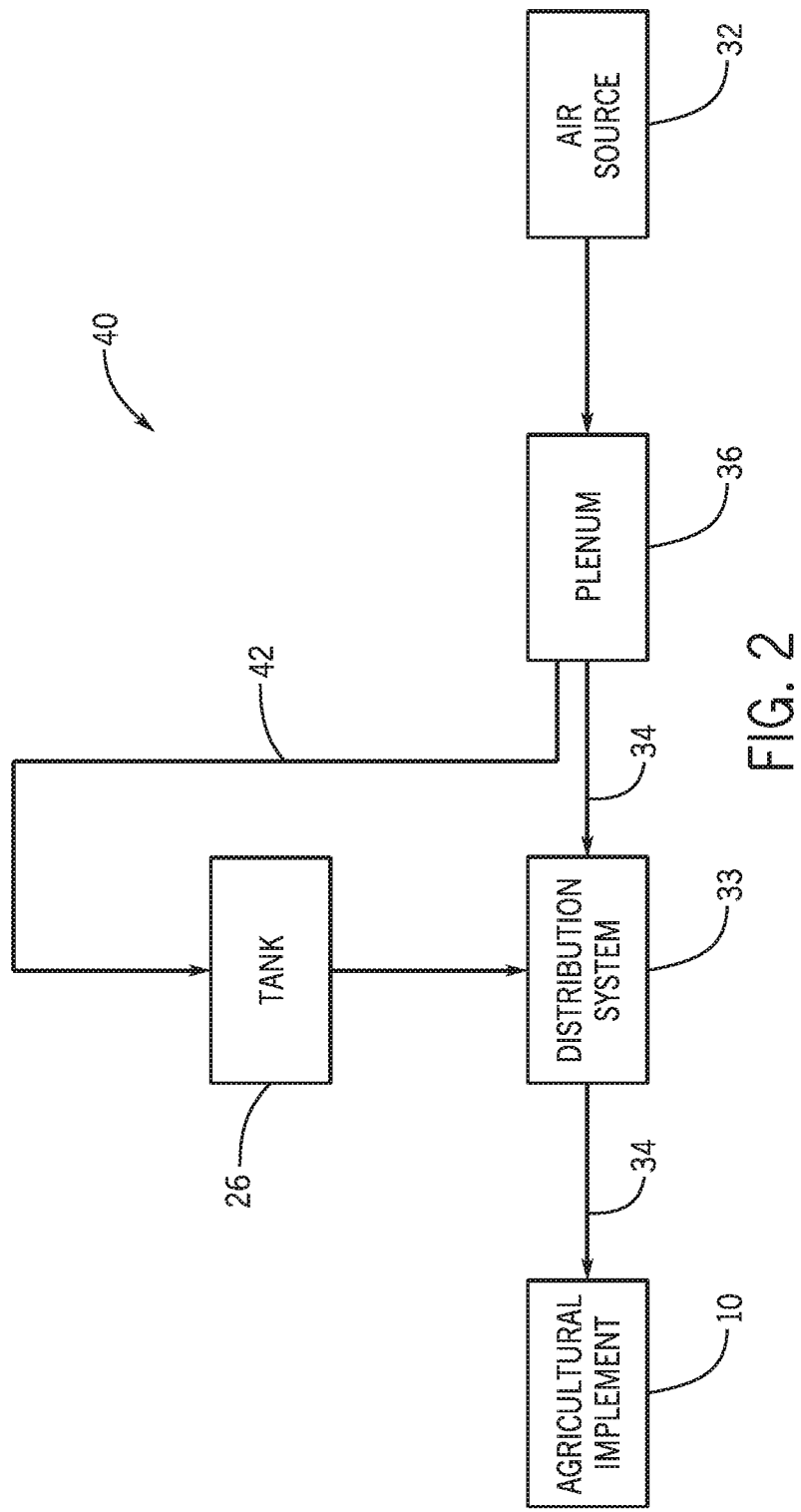
FIG. 2 is a block diagram of an embodiment of a seeding system configured to supply pressurized air and seeds to the agricultural implement and air cart of FIG. 1.

FIG. 2 is a block diagram of an embodiment of a seeding system 40 configured to supply seeds from the tank 26 to the agricultural implement 10 via the hose 34. In certain embodiments, the seeding system 40 is a product delivery system configured to distribute granular product and air to the agricultural implement 10. Moreover, in certain embodiments, the seeding system 40 may be referred to as a pneumatic product delivery system. In the illustrated embodiment, the air source 32 supplies a flow of pressurized air to the plenum 36. As will be described in detail below, the plenum 36 is configured to receive the air from the air source 32 and to distribute the air throughout the seeding system 40. In the illustrated embodiment, the hoses 34 couple to the plenum 36 to direct air to the distribution system 33 from the plenum 36. It will be appreciated that the plenum 36 may couple to 1, 2, 3, 4, 5, 6, 7, 8, 9, 10, 11, 12, 13, 14, 15, 16, or any suitable number of hoses 34 to distribute air to the distribution system 33. Moreover, a pressurization hose 42 extends from the plenum 36 to the tank 26. In certain embodiments, the pressurization hose 42 may supply air to multiple tanks (e.g., in a serial configuration or a parallel configuration). In such embodiments, the air flow to each tank may be controlled by valves. As mentioned above, the tank 26 is pressurized to enhance seeding and/or metering operations. For example, seed dispersal into the distribution system 33 may be improved by pressurizing the tank 26 to encourage seeds to flow toward the distribution system 33.

Moreover, the tank 26 is configured to supply seeds to the distribution system 33. In certain embodiments, the distribution system 33 is coupled directly to the tank 26. For example, the distribution system 33 may be integral with the tank 26. The distribution system 33 is configured to receive the seeds from the tank 26 and to direct the seeds into the hoses 34 extending from the plenum 36. The seeds and pressurized air combine in the distribution system 33, and the pressurized air carries and/or directs the seeds toward the agricultural implement 10 for planting via the opener assemblies 16. In certain embodiments, each hose 34 may include multiple sections (e.g., one section extending from the plenum to the distribution system and another section extending from the distribution system to the header). Each section may be formed from a flexible conduit or a substantially rigid line. Each hose may be formed from any suitable number of sections (e.g., including one or more flexible conduits and/or one or more substantially rigid lines).

Figure 3:
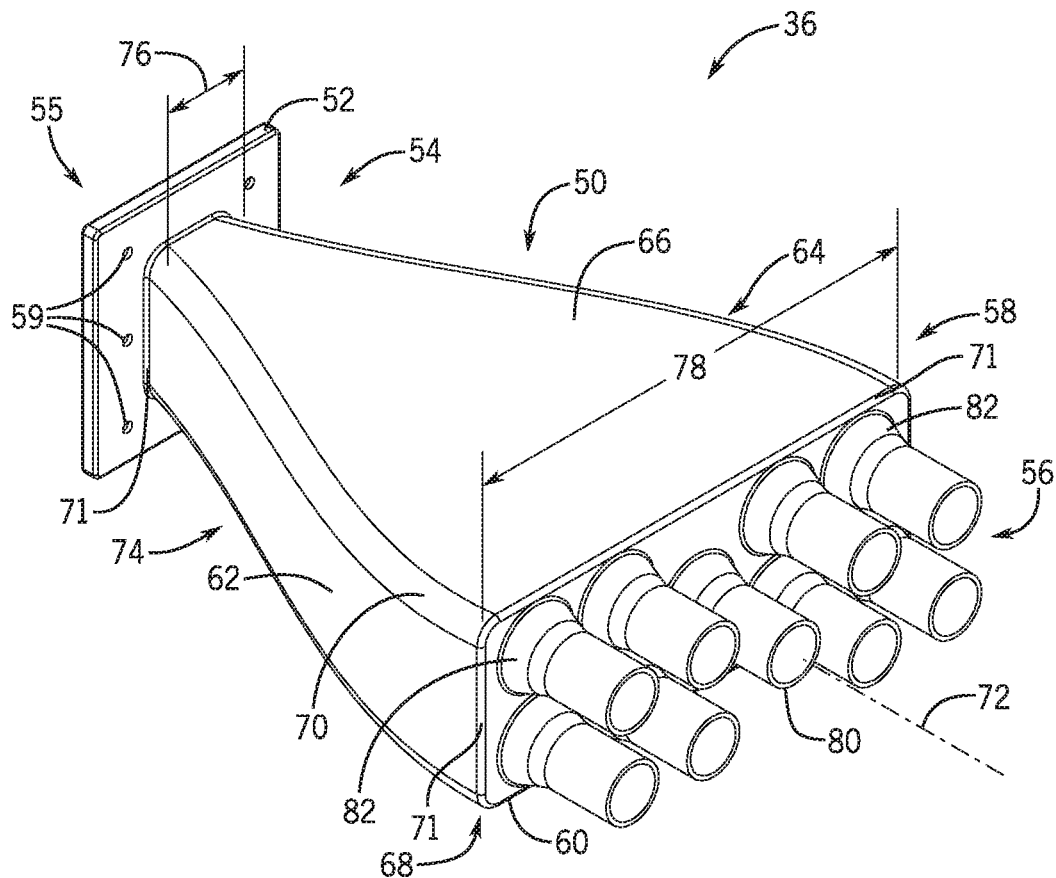
FIG. 3 is a perspective view of an embodiment of a plenum configured to direct pressurized air to the agricultural implement and air cart of FIG. 1.

FIG. 3 is a perspective view of an embodiment of the plenum 36. The plenum 36 includes a body 50 and a flange 52 positioned at a first end 54 of the body 50. The plenum 36 also includes outlet ports 56 positioned at a second end 58 of the body 50. In the illustrated embodiment, the plenum 36 includes an inlet 55 fluidly coupled to the air source 32 (e.g., via coupling of the flange 52 to a body of the air source 32) and configured to direct air from the air source 32 into the plenum 36. In the illustrated embodiment, the flange 52 includes apertures 59 configured to rigidly couple the plenum 36 to the body of the air source 32 or to a conduit distributing air from the air source 32 (e.g., via fasteners). However, in other embodiments, the flange 52 may be welded, clamped, or otherwise secured to the air source 32 or conduit. Moreover, in certain embodiments, the flange 52 may be coupled to a hose or duct that supplies air from the air source 32.

In the illustrated embodiment, the outlet ports 56 are configured to couple to the hoses 34 to supply pressurized air to the distribution system 33 and, as a result, to the agricultural implement 10. For example, the hoses 34 may be clamped or otherwise coupled to the outlet ports 56. The outlet ports 56 are generally cylindrical. The outlet ports 56 extend from and are supported by a face element 60 at the second end 58 of the plenum body 50 (e.g., the outlet ports 56 are positioned on the face element 60).

The body 50 of the plenum 36 is formed by a first side (e.g., first wall) 62 and a second side (e.g., second wall) 64, each coupled to a top element (e.g., top wall) 66 and a bottom element 68 (e.g., bottom wall). In the illustrated embodiment, edges 70 between the first and second sides 62, 64 and the top and bottom elements 66, 68 are rounded (e.g., arcuate). However, in other embodiments, the edges 70 may be chamfered, angled, or any other suitable shape to enhance the structural integrity of the plenum 36, to enhance the air distribution properties of the plenum 36, to facilitate the assembly and/or production of the plenum 36, to reduce the pressure drop through the plenum 36, or a combination thereof. Moreover, in the illustrated embodiment, rounds 71 are included at the interface between the sides/elements of the plenum 36. For example, the rounds 71 form a transition between the face element 60 and the top element 66. Furthermore, the rounds 71 form a transition between the flange 52 and the body 50 of the plenum 36. In the illustrated embodiment, the rounds 71 are generally arcuate or curved. However, in other embodiments, the rounds 71 may be chamfered, linear, angled, or any other suitable shape to enhance the structural integrity of the plenum 36, to enhance the air distribution properties of the plenum 36, to facilitate the assembly and/or production of the plenum 36, to reduce the pressure drop through the plenum 36, or a combination thereof.

As shown in FIG. 3, the first and second sides 62, 64 are substantially mirrored or symmetrical about a longitudinal axis/centerline 72. Additionally, the top and bottom elements 66, 68 are also mirrored about the longitudinal axis/centerline 72. However, in other embodiments, the first and second sides 62, 64 and/or the top and bottom elements 66, 68 may be asymmetrical about the longitudinal axis/centerline 72. For example, operating parameters of the air source 32 may encourage an asymmetrical plenum 36 to establish desired flow characteristics at the outlet ports 56. As used herein, flow characteristics may refer to the pressure, velocity, flow rate, or a combination thereof, of the air flow within the plenum 36. Moreover, the first and second sides 62, 64 each include a curved portion 74 extending from the first end 54 to the second end 58. In the illustrated embodiment, the curved portion 74 forms a first width 76 at the first end 54 that is smaller than a second width 78 at the second end 58. As used herein, width refers to a lateral extend of the body 50 of the plenum 36. In other words, the first and second sides 62, 64 flare out from the inlet 55 to the face element 60. The curved portion 74 may be any suitable shape to establish desired air flow characteristics at the outlet ports 56.

In other embodiments, a first portion of at least one side proximate to the flange 52 (e.g., at the first end 54) may be substantially linear while a second portion proximate to the face element 60 (e.g., at the second end 58) includes the curved portion 74. For example, the plenum 36 may be substantially bell shaped. However, in other embodiments, each side of the plenum 36 may be another suitable shape, e.g., including a linear/straight portion in place of the curved portion 74 or in addition to the curved portion 74. For example, in certain embodiments, a first portion of at least one side proximate to the flange 52 (e.g., at the first end 54) may include a curved portion while a second portion proximate to the face element 60 (e.g., at the second end 58) may be substantially linear. In further embodiments, at least one side may include multiple substantially linear portions, and/or at least one side may be substantially linear from the flange 52 to the face element 60. At least one side of the plenum may also include multiple curved portions, in certain embodiments.

Furthermore, while the top element 66 and the bottom element 68 are substantially flat in the illustrated embodiment, it should be appreciated that in alternative embodiments, the top element and/or the bottom element may be contoured to establish desired air flow characteristics at the outlet ports 56. For example, in certain embodiments, the top element and/or the bottom element may include one or more substantially linear portions and/or one or more curved portions. For example, the top element and/or the bottom element may have a continuous curve between the flange 52 (e.g., at the first end 54) and the face element 60 (e.g., at the second end 58).

Turning to the outlet ports 56, in the illustrated embodiment, the outlet ports 56 are positioned in an approximately symmetrical arrangement relative to the longitudinal axis/centerline 72. Accordingly, the outlet ports 56 are positioned on opposite lateral sides of a pressurization port 80. In the illustrated embodiment, the pressurization port 80 is centered laterally and vertically on the face element 60. For example, in the illustrated embodiment, the longitudinal axis/centerline 72 is coaxial with the pressurization port 80. However, it should be appreciated that in alternative embodiments, the pressurization port may be positioned at other locations on the face element (e.g., vertically and/or laterally offset from the longitudinal axis/centerline). For example, the pressurization port may be laterally centered on the face element, and vertically offset from the longitudinal axis/centerline. As will be described in detail below, the pressurization port 80 is configured to direct an air flow to the tank 26 to maintain a positive pressure within the tank 26 during seeding operations. Moreover, by providing a pressurization port 80 on the plenum 36 that is coupled to the tank 26, sectional control of the seeding operations is enabled without impacting the pressurization of the tank 26. For example, when seed flow to certain ground engages assemblies is disabled, air flow through the hoses that supply the disabled ground engages assemblies may increase due to the reduced resistance associated with termination of the seed flow through the hoses. Because the pressurization port 80 is centered laterally on the face element 60, the pressurization port 80 may receive a sufficient air flow despite the air flow imbalance between outlet ports 56. Accordingly, the pressure within the tank may be maintained, thereby maintaining the accuracy of seed metering into the hoses.

Moreover, in embodiments in which the air cart 12 includes multiple tanks 26, each tank 26 may be pressurized during sectional control (e.g., via a respective plenum, via a network of lines extending from the pressurization line, via multiple pressurization lines extending from multiple pressurization ports of a single plenum, etc.). In the illustrated embodiment, each outlet port 56 includes an outlet transition 82 extending between the outlet port 56 and the face element 60. In certain embodiments, the outlet transition 82 may include a fitting configured to couple the outlet port 56 to the face element 60. However, in other embodiments, the outlet ports 56 and/or the pressurization port 80 may be integrally formed with the body 50 of the plenum 36. For example, in certain embodiments, the plenum 36 may be single piece formed from a metal (e.g., via a casting process), polymer (e.g., via a rotational molding (rotomolding) process), or any other suitable material. As will be described in detail below, the hoses 34 are configured to couple to the outlet ports 56 such that desired flow characteristics (e.g., a desired pressure profile and uniform velocity) is provided to the agricultural implement 10 via the hoses 34.

Figure 4:
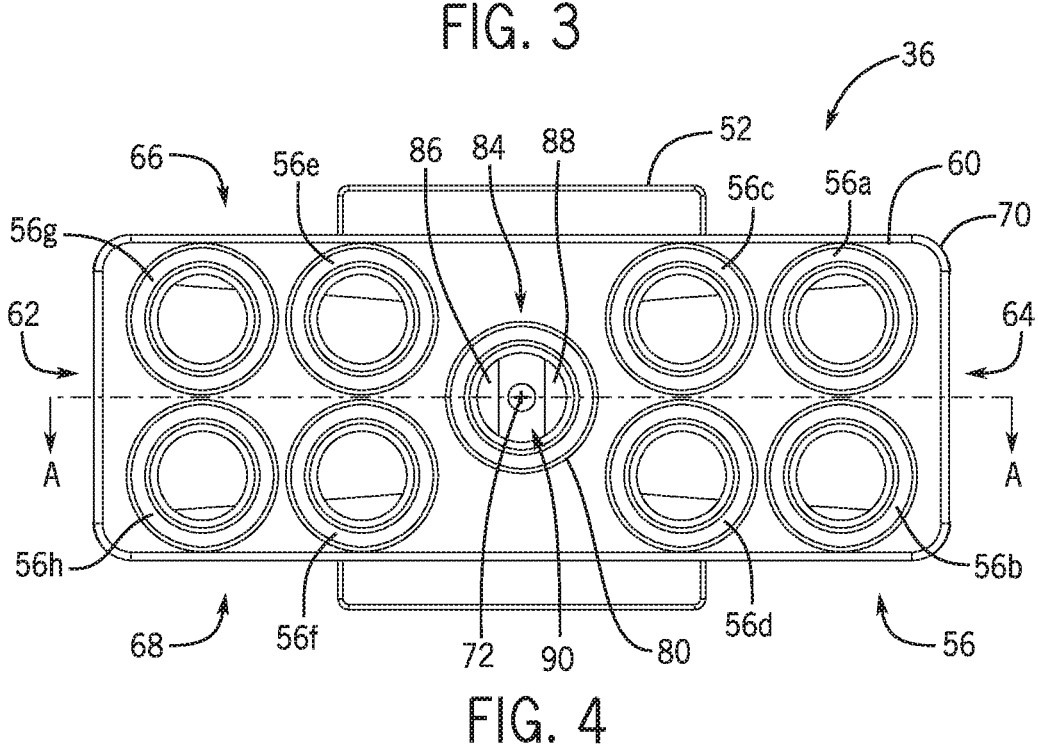
FIG. 4 is a front view of the plenum of FIG. 3.

FIG. 4 is a front view of the face element 60 of the plenum 36. As described above, the outlet ports 56 are arranged on the face element 60 in a substantially symmetrical arrangement relative to the longitudinal axis/centerline 72. Moreover, while the illustrated embodiment includes eight outlet ports 56, in other embodiments 1, 2, 3, 4, 5, 6, 7, 9, 10, 11, 12, 13, 14, 15, or any suitable number of outlet ports 56 may be included to provide air flow to the agricultural implement 10. Moreover, in certain embodiments, the outlet ports 56 are arranged asymmetrically on the face element 60. For example, the spacing between adjacent outlet ports may be unequal. Furthermore, in other embodiments, the outlet ports 56 may be arranged on the first side 62, the second side 64, the top element 66, and/or the bottom element 68 based on desired air flow through the outlet ports 56. In addition, while the illustrated embodiment includes a single pressurization port 80, it should be appreciated that in alternative embodiments, the plenum 36 may include 2, 3, 4, 5, 6, or more pressurization ports 80 (e.g., each laterally centered on the face element, each positioned proximate to the longitudinal axis/centerline, etc.). In such embodiments, certain pressurization ports may supply air to respective tanks, and/or multiple pressurization ports may supply air to a single tank.

As will be described in detail below, the plenum 36 includes a baffle assembly 84 configured to direct air flow from the inlet 55 to the outlet ports 56. In the illustrated embodiment, a first baffle 86 and a second baffle 88 are disposed within the plenum 36. The first and second baffles 86, 88 are arranged at an angle, relative to one another, such that a first passage 90 is formed between the first and second baffles 86, 88. The first passage 90 directs air flow down the longitudinal axis/centerline 72, while also enabling flow around either side of the first and second baffles 86, 88.

Moreover, the baffle assembly 84 is configured to produce desired flow characteristics (e.g., a pressure profile and uniform velocity/flow rate) through the plenum 36. For example, the baffle assembly 84 may be configured to direct the air flow through the plenum 36 such that different outlet ports 56 direct air toward the agricultural implement 10 at different pressures (e.g., to account for different lengths of the hoses 34). For example, the outlet ports 56a, 56b may direct air toward the agricultural implement 10 at a higher pressure than the outlet ports 56c, 56d due to the configuration of the baffle assembly 84 (e.g., to account for higher pressure losses associated with longer hoses). Additionally, in certain embodiments, the outlet ports 56g, 56h may distribute air at a higher pressure than the outlet ports 56e, 56f (e.g., to account for higher pressure losses associated with longer hoses). Also, in other embodiments, the outside ports (e.g., 56a, 56b, 56g, 56h) may be configured to have a higher pressure than the inside ports (e.g., 56c, 56d, 56e, 56f). In addition, the pressure at the lower ports may be greater than the pressure at the upper ports. Accordingly, as will be described below, longer hoses 34 (e.g., based on the total length of the hose from the plenum to the header of the implement) may be coupled to the outlet ports 56 providing higher pressures to account for line losses and to reduce the likelihood of plugging in the hoses 34.

Figure 5:
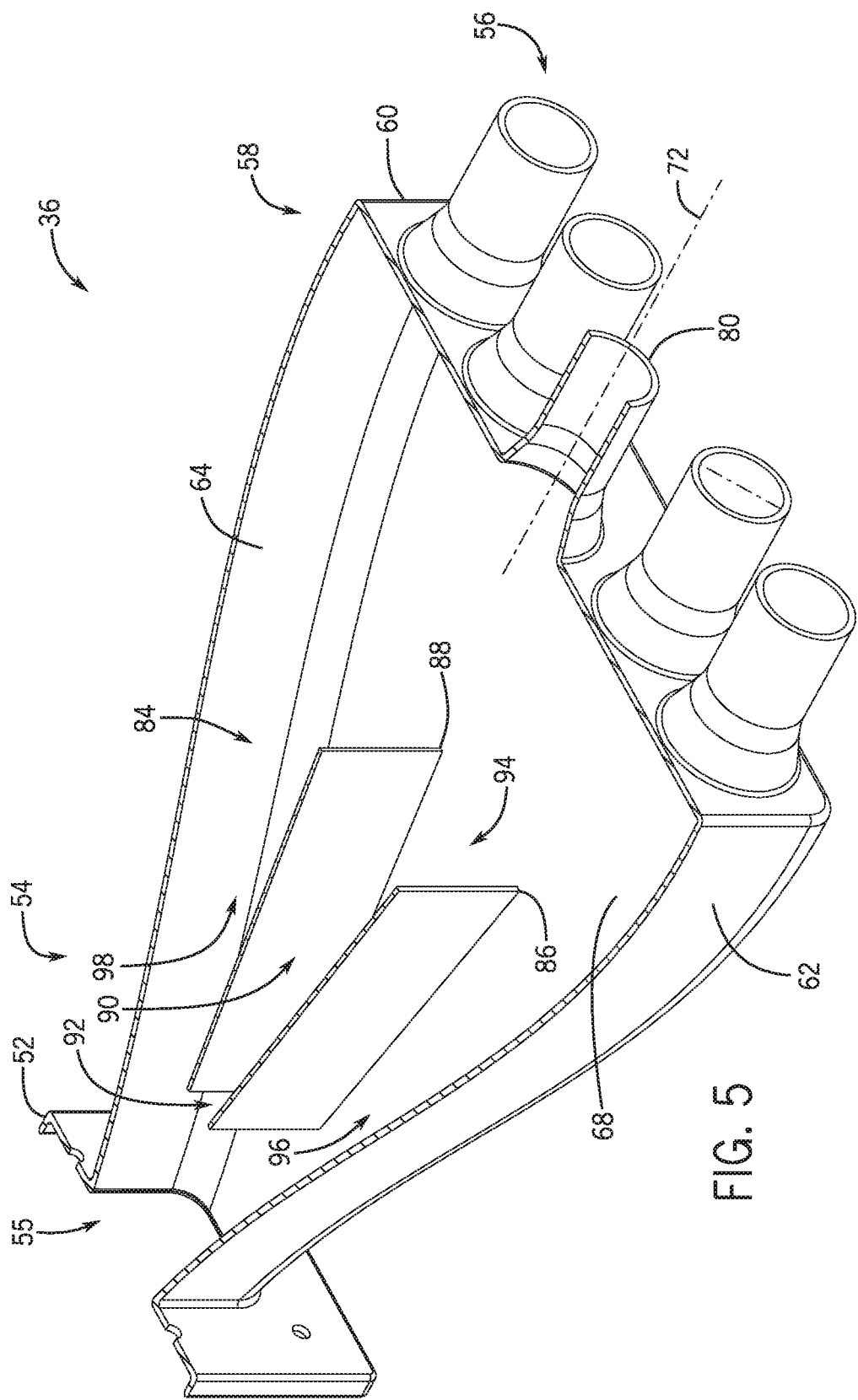
FIG. 5 is a sectional view of the plenum of FIG. 3, taken along the line A-A of FIG. 4.

FIG. 5 is a cross-sectional perspective view of the plenum 36 taken along line A-A of FIG. 4. As described above, the outlet ports 56 are arranged symmetrically about the longitudinal axis/centerline 72, in the illustrated embodiment. As a result, the four outlet ports 56 depicted in FIG. 5 are representative of the other four outlet ports 56 not shown. Moreover, half of the pressurization port 80 is not shown. The baffle assembly 84 is positioned proximate to the first end 54 of the plenum 36, in the illustrated embodiment. However, in other embodiments, the baffle assembly 84 may be longitudinally centered within the plenum 36 (e.g., the baffle assembly 84 may be substantially equidistant from the first end 54 and second end 58), proximate to the second end 58 of the plenum 36, or in any other suitable location to direct the air flow to the outlet ports 56. As mentioned above, the first baffle 86 and the second baffle 88 are angled, relative to one another (and to the longitudinal axis/centerline 72), to form the first passage 90. As a result, a first passage opening 92 is smaller than a second passage opening 94 (e.g., a cross-sectional area of the first passage opening 92 is less than a cross-sectional area of the second passage opening 94). As will be appreciated, the larger second passage opening 94 is configured to facilitate expansion of the flow within the first passage 90. Accordingly, different outlet ports 56 may receive the air flow at different velocities. Moreover, while the illustrated embodiment includes the first and second baffles 86, 88, in other embodiments 0, 1, 3, 4, 5, 6, or any suitable number of baffles may be included to direct the air flow through the plenum 36. As will be described below, supplying air to the outlet ports 56 with different pressures may enable the hoses 34 having different lengths to obtain the desired flow characteristics and reduce the likelihood of plugging of the hoses 34.

The baffle assembly 84 extends from the bottom element 68 of the plenum 36 to the top element 66 of the plenum 36. As a result, the baffle assembly forms three flow passages. The first passage 90 is disposed between the first and second baffles 86, 88. A second passage 96 is formed between the first side 62 of the plenum 36 and the first baffle 86, and a third passage 98 is formed between the second side 64 of the plenum 36 and the second baffle 88. In certain embodiments, the first, second, and third passages 90, 96, 98 have varying flow characteristics based on the air flow from the air source 32. For example, the air source 32 may introduce a high pressure air flow into the plenum 36 at the inlet 55 that is directed toward the first passage 90. However, the first and second baffles 86, 88 are configured to divert a portion of the air flow toward the second and third passages 96, 98. Additionally, the configuration of the baffle assembly 84 may modify the flow characteristics in each of the passages 90, 96, 98. For example, as the cross-sectional area of each flow passage increases, the velocity of the flow traveling through the passage decreases. Moreover, the baffle assembly 84 may be configured to account for multiple flow vortices at the inlet 55 introduced by the air flow from the air source 32. Accordingly, the baffle assembly 84 may be configured to obtain desired flow characteristics within the plenum 36.

Figure 6:
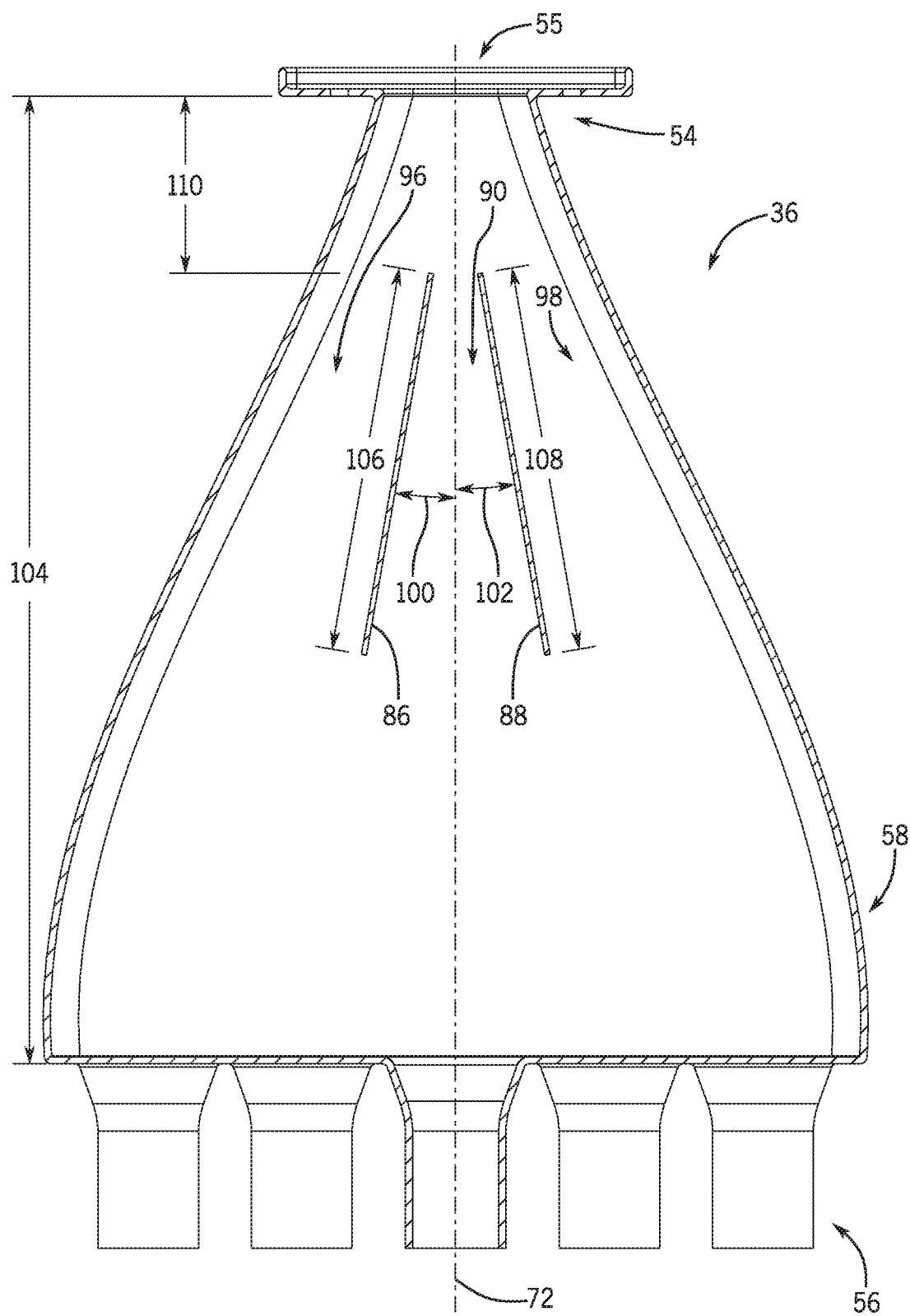
FIG. 6 is a cross-sectional top view of the plenum of FIG. 3.

FIG. 6 is a cross-sectional top view of the plenum 36 taken along line A-A of FIG. 4. As shown, the baffle assembly 84 is symmetrical about the longitudinal axis/centerline 72. In other words, the longitudinal axis/centerline 72 is coaxial with the center of the first passage 90.

However, in other embodiments, the baffle assembly 84 may not be symmetric about the longitudinal axis/centerline 72. For example, in certain embodiments the first baffle 86 may be arranged at a larger angle relative to the longitudinal axis/centerline 72 than the second baffle 88. To that end, the first baffle 86 is arranged at a first angle 100 relative to the longitudinal axis/centerline 72. Moreover, the second baffle 88 is arranged at a second angle 102 relative to the longitudinal axis/centerline 72. In certain embodiments, the first and second angles 100, 102 are equal. However, in other embodiments, the first and second angles 100, 102 are not equal. In the illustrated embodiment, the first angle 100 is approximately 10 degrees and the second angle 102 is approximately 10 degrees. However, in other embodiments, the first and second angles 100, 102 may be 5 degrees, 10 degrees, 20 degrees, 30 degrees, 40 degrees, 50 degrees, 70 degrees, 80 degrees, or any other angle suitable for the operating conditions. Moreover, in certain embodiments, the first and second angles 100, 102 may be between 5 degrees and 30 degrees, between 30 degrees and 50 degrees, between 50 degrees and 70 degrees, between 70 degrees and 90 degrees, or any other suitable range based on the operating conditions.

Moreover, the first and second baffles 86, 88 are configured to extend a distance along a length 104 of the plenum 36 to direct the air flow toward the outlet ports 56. For example, the first baffle 86 has a first length 106 and the second baffle has a second length 108. In the illustrated embodiment, the first length 106 is equal to the second length 108. However, in other embodiments, the first length 106 may not be equal to the second length 108. For example, the first length 106 may be longer than the second length 108 to further direct the air flow down the second passage 96. In the illustrated embodiment, the first and second lengths 106, 108 are approximately 40 percent of the length 104 of the plenum 36. However, in other embodiments, the first and second lengths 106, 108 may be 10 percent, 20 percent, 30 percent, 50 percent, 60 percent, 70 percent, 80 percent, 90 percent, or any suitable percentage of the length 104 of the plenum 36. Additionally, the first and second lengths 106, 108 may be between 10 and 40 percent, 40 to 60 percent, 60 to 80 percent, or any suitable percentage of the length 104 of the plenum 36. As will be appreciated, the first and second lengths 106, 108 may be varied to obtain desirable flow characteristics within the plenum 36.

Furthermore, the baffle assembly 84 is positioned proximate to the first end 54 of the plenum 36, in the illustrated embodiment. The first and second baffles 86, 88 are positioned at an offset distance 110 from the inlet 55. In the illustrated embodiment, the offset distance 110 is approximately 18 percent of the length 104 of the plenum 36. However, in other embodiments, the offset distance 110 may be 5 percent, 10 percent, 20 percent, 30 percent, 40 percent, 50 percent, or any other suitable percentage of the length 104 to direct the air flow toward the outlet ports 56. Additionally, the offset distance 110 may be between 5 percent and 20 percent, 20 percent and 30 percent, 40 percent and 50 percent, or any other suitable range of percentages of the length 104 of the plenum 36. In certain embodiments, the first baffle 86 and the second baffle 88 are an equal offset distance 110 from the inlet 55. However, in other embodiments, the first baffle 86 may be closer to the inlet 55 or the second baffle 88 may be closer to the inlet 55. As will be appreciated, the position of the baffle assembly 84 relative to the inlet 55 may be modified to obtain desirable flow characteristics in the plenum 36. Moreover, while the illustrated embodiment includes a fixed baffle assembly 84, in certain embodiments the baffle assembly 84 and/or the individual baffles of the baffle assembly 84 (e.g., the first baffle 86, the second baffle 88) may be adjustable. For instance, the first and second baffles 86, 88 may be disposed on a track that is configured to enable the first and second baffles 86, 88 to adjust the offset distance 110. Furthermore, the first and second angles 100, 102 may be adjustable. Additionally, in certain embodiments, the baffle assembly 84 may be automatically adjustable (e.g., via actuators) to provide air flow customization.

Accordingly, the air flow may be regulated (e.g., controlled) through the plenum 36 to distribute air to different outlet ports 56 at different velocities, flow rates, pressures, or a combination thereof. For example, the pressurization port 80 is configured to couple to the pressurization hose 42 to pressurize the tank 26. In certain embodiments, the desired pressure to the tank 26 may be less than the desired pressure of the hoses 34 configured to direct the flow of air to the agricultural implement 10. Moreover, in certain embodiments, the flow rate to the tank 26 may also be lower than the flow rate to the hoses 34. By utilizing a desirable configuration of the baffle assembly 84 and/or a desired shape of the plenum body 50, the flow rates to different parts of the plenum 36 may be regulated to satisfy a variety of desired flow conditions. In certain embodiments, a valve may be fluidly disposed between the pressurization port and the tank (e.g., along the pressurization hose) to control the pressure within the tank.

Figure 7:
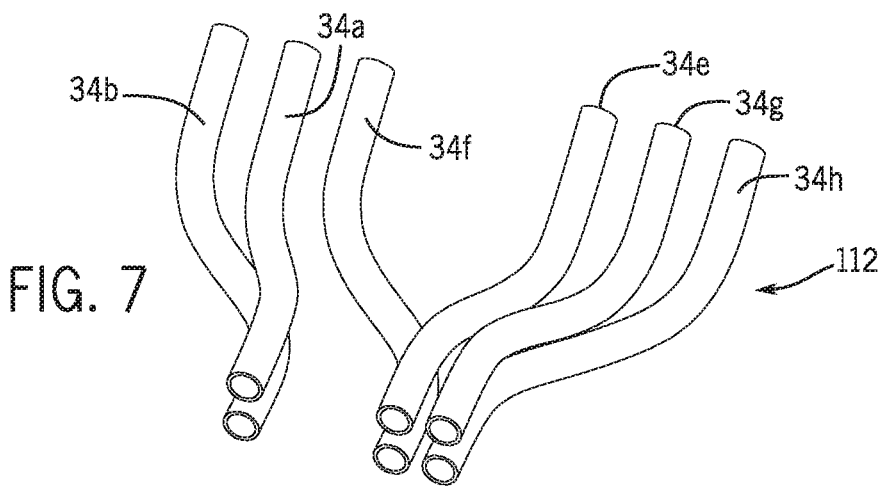
FIG. 7 is a perspective view of an embodiment of a routing configuration for hoses that may be coupled to the plenum of FIG. 3.
Figure 8:
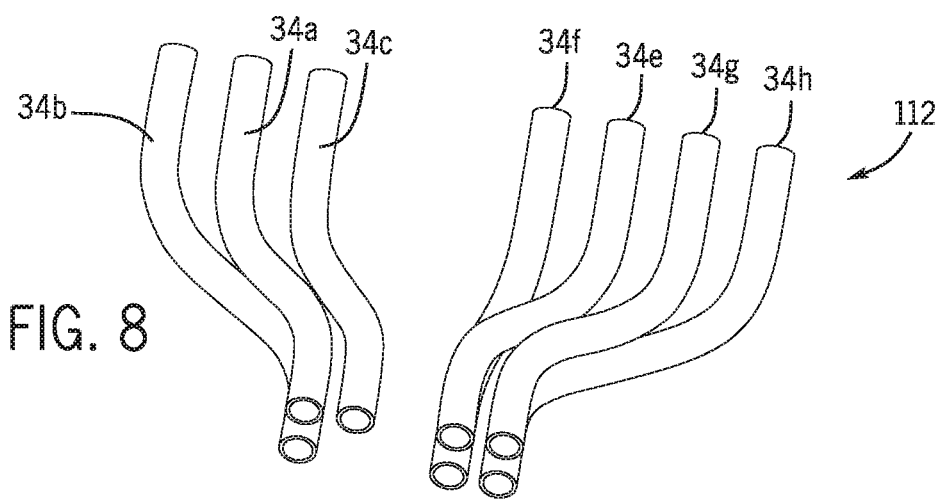
FIG. 8 is a perspective view of another embodiment of a routing configuration for hoses that may be coupled to the plenum of FIG. 3.
Figure 9:
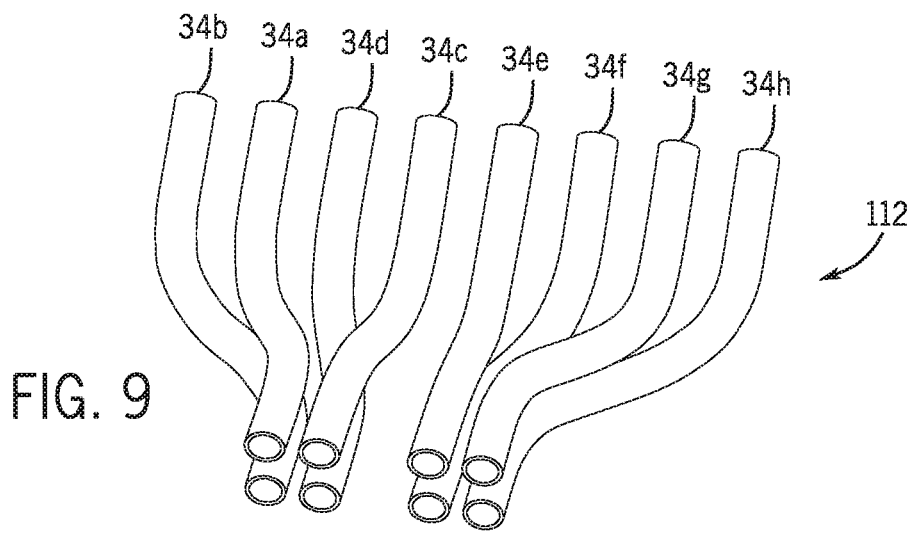
FIG. 9 is a perspective view of a further embodiment of a routing configuration for hoses that may be coupled to the plenum of FIG. 3.

FIGS. 7-9 are perspective views of a routing configuration 112 of the hoses 34 extending from the plenum 36. It should be noted that the hoses 34 illustrated in FIGS. 7-9 are configured to extend to the distribution system 33 to receive the seeds before further extending to the agricultural implement 10. As a result, the hoses 34 illustrated in FIGS. 7-9 are described in relation to their lengths relative to the total length of the hoses 34 extending to the agricultural implement 10 and not to the length of the hoses 34 extending to the distribution system 33. Furthermore, it should be noted that the pressurization hose is removed for clarity. FIG. 7 illustrates an embodiment of a six hose system configured to direct air to the agricultural implement 10. In the illustrated embodiment, only six of the outlet ports 56 are configured to direct air to the hoses 34 (e.g., outlet ports 56*a*, 56*b*, 56*e*, 56*f*, 56*g*, 56*h*). The other outlet ports 56 (e.g., outlet ports 56*c*, 56*d*) may be capped to block air flow out of the plenum. In the illustrated embodiment, the hose 34*b* is coupled to the outlet port 56*b*, and the hose 34*e* is coupled to the outlet port 56*e*. In certain embodiments, the outlet port 56*b* is configured to provide a higher pressure than the outlet port 56*e*. As a result, the hose 34*b* may be longer than the hose 34*e*, and each hose may provide a desired air flow to the respective portion of the implement. Similarly, the corresponding hoses 34*a*, 34*f*, 34*g*, 34*h* may couple to corresponding outlet ports 56*a*, 56*f*, 56*g*, 56*h* based on the length of the hoses 34. However, it should be noted that other six hose routing configurations may be utilized. For example, the outlet ports 56*e*, 56*f* may be plugged, and hoses may be coupled to the outlet ports 56*c*, 56*d*. Additionally, longer hoses 34 having a higher pressure loss may couple to outlet ports 56 configured to provide a higher pressure to account for line losses and/or to reduce the likelihood of seed plugging in the hoses, 34. In this manner, desired air flow characteristics at the agricultural implement 10 may be established despite variations in the lengths of the hoses from the plenum to the headers of the implement.

FIG. 8 is an embodiment of a seven hose system configured to direct air to the agricultural implement 10. As mentioned above, in certain configurations the hoses 34 having longer lengths may be coupled to the outlet ports 56 configured to provide higher air pressures. For example, the baffle assembly 84 may be configured to direct an air flow having a higher pressure to the outlet port 56b associated with the longer hose 34b. Furthermore, in other embodiments, different outlet ports 56 may be plugged to enable the seven hose configuration. For example, the outlet port 56f may be plugged to enable the desired flow characteristics, and a hose may be coupled to the outlet port 56d. In addition, it should be noted that other seven hose routing configurations may be utilized. FIG. 9 is an embodiment of an eight hose system configured to direct air to the agricultural implement 10. In the illustrated embodiment, the hose 34b is longer than the hose 34e. As a result, the air in hose 34b may experience greater line losses. Accordingly, the baffle assembly 84 may be configured to direct air at a higher pressure to the outlet port 56b associated with the hose 34b.

As described in detail above, the plenum is configured to direct the air flow received from the air source toward the agricultural implement and the tank. For example, the plenum may include the baffle assembly to direct air in the plenum 36 to the outlet ports. The baffle assembly may be configured to regulate the pressure of the air flow to certain outlet ports as a function of the hoses 34 coupled to the outlet ports. As a result, the hoses 34 coupled to the outlet ports may receive the air flow at different air velocities to provide the desired static pressure in the hoses 34. In embodiments in which certain hoses 34 are longer than other hoses 34, the outlet ports coupled to the longer hoses 34 (e.g., hose 34b) may be configured to distribute air at a higher pressure than the outlet ports coupled to the shorter hoses 34 (e.g., 34e). Moreover, the plenum includes the pressurization port configured to couple to the pressurization hose to supply pressurized air to the tank. As mentioned above, the baffle assembly may provide the air flow to the pressurization port at a desired pressure/velocity/flow rate to facilitate seeding operations. However, it should be appreciated that in certain embodiments, the baffle assembly may be omitted, and the shape of the body may establish the desired flow characteristics from each outlet port and/or from the pressurization port.

Figure 10:
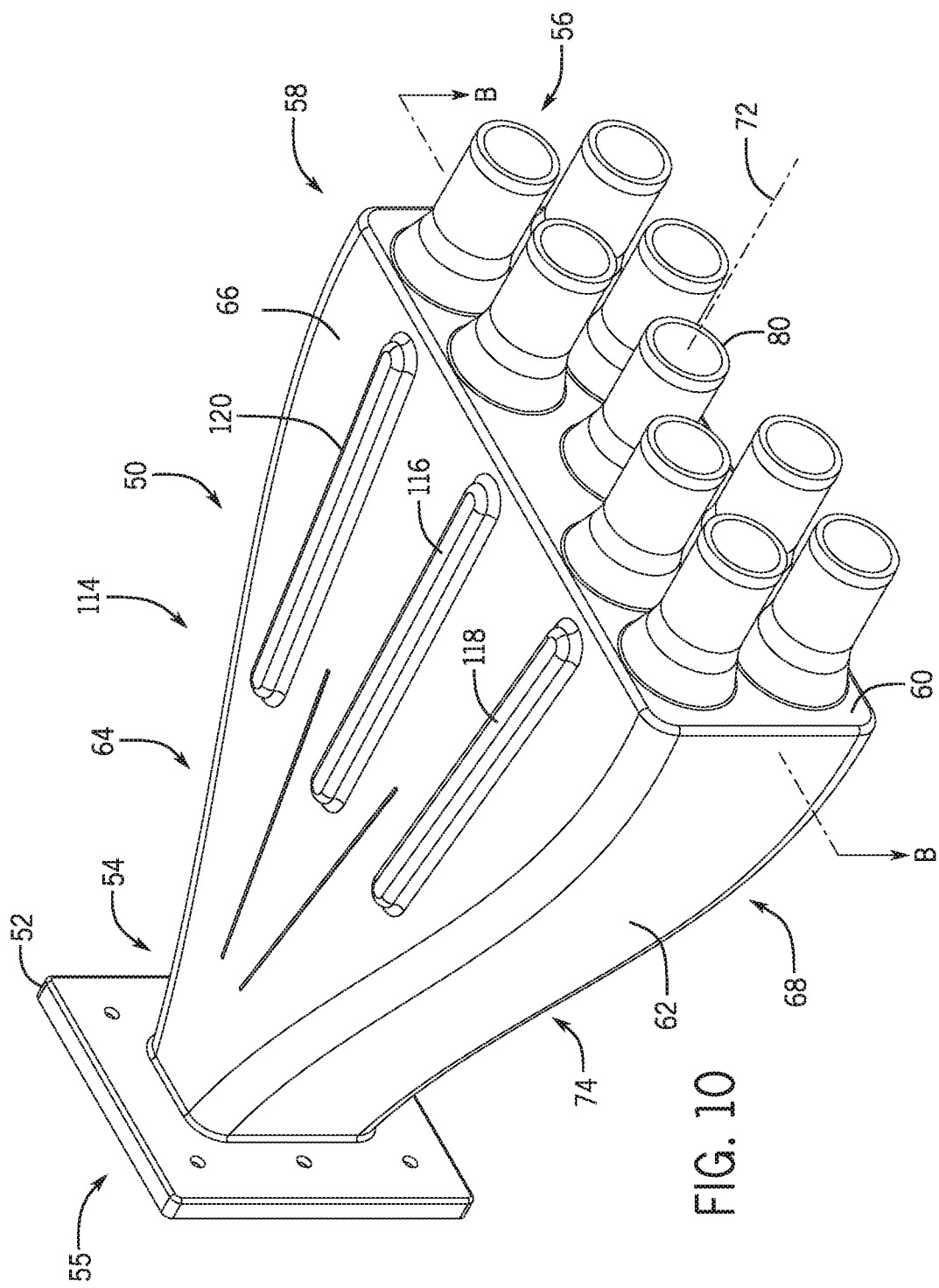
FIG. 10 is a perspective view of another embodiment of a plenum configured to direct pressurized air to the agricultural implement and air cart of FIG. 1.

FIG. 10 is a perspective view of another embodiment of a plenum 114 configured to direct pressurized air to the agricultural implement and air cart of FIG. 1. Similar to the plenum 36 described above with reference to FIGS. 3-6, the plenum 114 includes a body 50 and a flange 52 positioned at a first end 54 of the body 50. The plenum 114 also includes outlet ports 56 positioned at a second end 58 of the body 50. In the illustrated embodiment, the plenum 114 includes an inlet 55 fluidly coupled to the air source 32 (e.g., via coupling of the flange 52 to a body of the air source 32) and configured to direct air from the air source 32 into the plenum 114. As previously discussed, the outlet ports 56 are configured to couple to the hoses 34 to supply pressurized air to the distribution system 33 and, as a result, to the agricultural implement 10. For example, the hoses 34 may be clamped or otherwise coupled to the outlet ports 56. The outlet ports 56 are generally cylindrical and positioned on a face element 60 at the second end 58 of the plenum body 50.

The body 50 of the plenum 114 is formed by a first side 62 and a second side 64, each coupled to a top element 66 and a bottom element 68. As shown, the first and second sides 62, 64 are substantially mirrored or symmetrical about a longitudinal axis/centerline 72. Additionally, the top and bottom elements 66, 68 are also mirrored about the longitudinal axis/centerline 72. Moreover, the first and second sides 62, 64 each include a curved portion 74 extending from the first end 54 to the second end 58.

Turning to the outlet ports 56, in the illustrated embodiment, the outlet ports 56 are positioned in an approximately symmetrical arrangement relative to the longitudinal axis/centerline 72. Accordingly, the outlet ports 56 are positioned on opposite lateral sides of a pressurization port 80. In the illustrated embodiment, the pressurization port 80 is centered laterally and vertically on the face element 60. For example, in the illustrated embodiment, the longitudinal axis/centerline 72 is coaxial with the pressurization port 80. As previously described, the pressurization port 80 is configured to direct an air flow to the tank 26 to maintain a positive pressure within the tank 26 during seeding operations.

In the illustrated embodiment, three ribs 116, 118, and 120 are formed on the top element 66 of the plenum body 50. In addition, as discussed in detail below, three corresponding ribs are formed on the bottom element 68 of the plenum body 50. The ribs are configured to enhance the structural rigidity of the top and bottom elements. For example, air flowing through the inlet 55 may cause the plenum 114 to become pressurized, thereby establishing a load on each side/element of the plenum 114. The ribs on the top and bottom elements may enable the elements to resist the pressure load, thereby substantially reducing deformation of the elements. As a result, the flow characteristics at the outlet ports 56, which may be affected by the shape of the top and bottom elements 66, 68, may be substantially maintained while the plenum 114 is pressurized.

In the illustrated embodiment, the plenum 114 includes a first rib 116 substantially aligned with the longitudinal axis/centerline 72, a second rib 118 positioned proximate to the first side 62, and a third rib 120 positioned proximate to the second side 64. As discussed in detail below, each rib is substantially aligned with the air flow proximate to the rib. In addition, each rib is particularly shaped to reduce the effect of the rib on the flow characteristics at the outlet ports 56 and/or to facilitate manufacturing of the plenum 114 (e.g., to reduce manufacturing costs). While the illustrated embodiment includes three ribs, it should be appreciated that more or fewer ribs may be utilized in alternative embodiments. For example, in certain embodiments, 1, 2, 3, 4, 5, 6, or more ribs may be formed on the top element 66 or the bottom element 68.

In the illustrated embodiment, the plenum 114 is formed by a rotational molding (rotomolding) process. For example, in certain embodiments, the body 50, the flange 52, the outlet ports 56, and the pressurization port 80 may be formed from a single piece of polymeric material via the rotational molding process. In addition, the ribs may be formed on the top and bottom elements by the rotational molding process (e.g., the rotational mold/tool may include recesses that correspond to the ribs). By forming the body 50, the flange 52, the outlet ports 56, the pressurization port 80, and the ribs 116, 118, 120 from a single piece of material via a rotational molding process, the manufacturing cost of the plenum 114 may be significantly reduced, as compared to plenums formed by coupling multiple separately formed components to one another.

Figure 11:
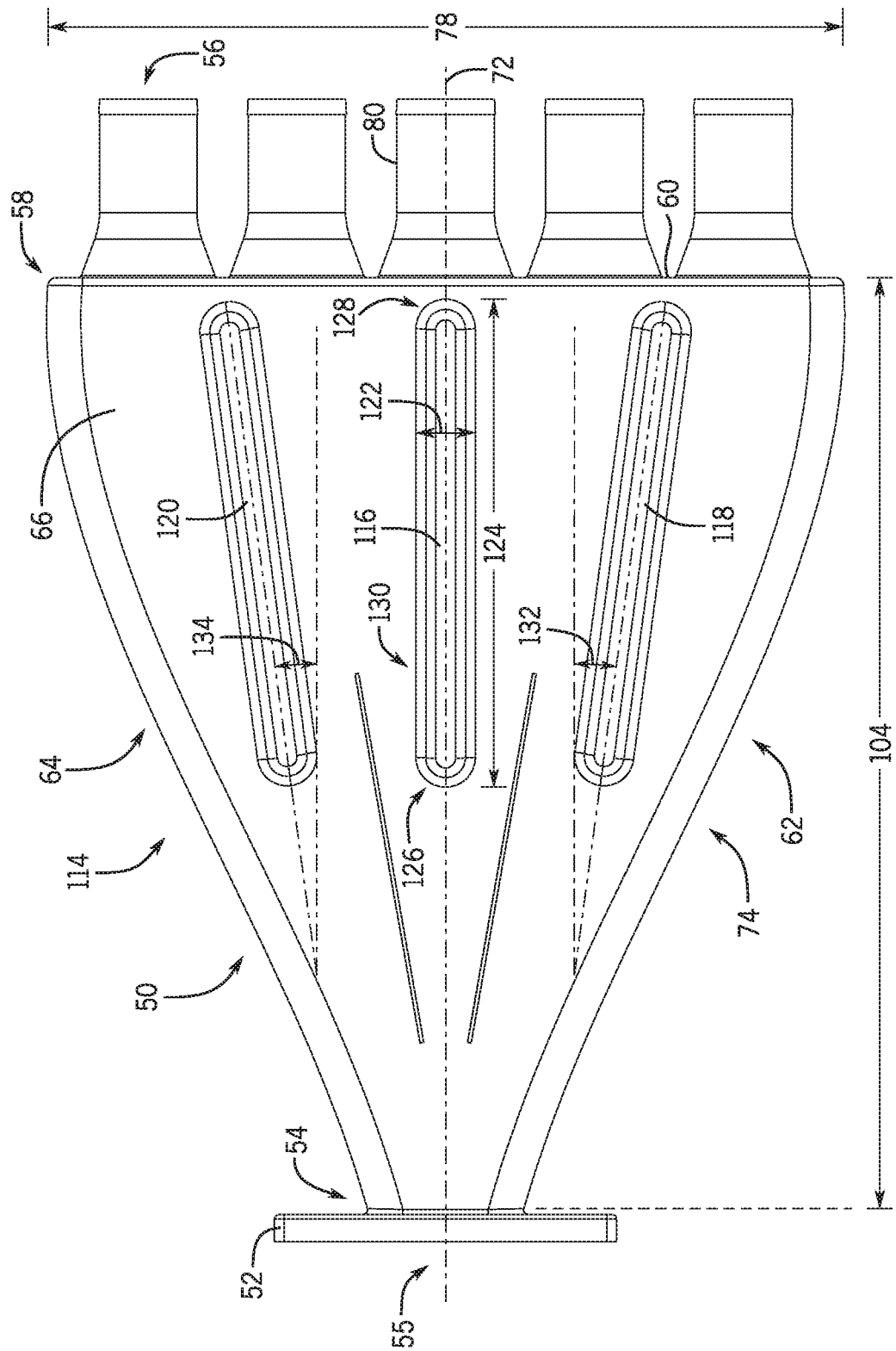
FIG. 11 is a top view of the plenum of FIG. 10.

FIG. 11 is a top view of the plenum 114 of FIG. 10. As illustrated, the first rib 116 is substantially aligned with the longitudinal axis/centerline 72. A width 122 of the first rib 116 and a length 124 of the first rib 116 may be particularly selected to enhance the structural rigidity of the top element 66 without substantially interfering with the air flow through the plenum 114. For example, the width 122 of the first rib 116 may be about 1 percent, about 2 percent, about 3 percent, about 4 percent, about 5 percent, or more of the width 78 of the face element 60. By way of further example, the width 122 of the first rib 116 may be about 1 to 10 percent, about 2 to 9 percent, or about 3 to 8 percent of the width 78 of the face element 60. In addition, the length 124 of the first rib 116 may be about 10 percent, about 20 percent, about 30 percent, about 40 percent, about 50 percent, or more of the length 104 of the plenum body 50. By way of further example, the length of the first rib 116 may be about 10 to 50 percent, about 15 to 45 percent, or about 20 to 40 percent of the length 104 of the plenum body 50. Furthermore, the first rib 116 includes a rounded leading edge 126, a rounded trailing edge 128, and rounded side edges 130. The rounded edges may substantially reduce the pressure drop of the air flow through the plenum 114, thereby substantially maintaining the flow characteristics at the outlet ports 56.

In the illustrated embodiment, the shapes of the second rib 118 and the third rib 120 are substantially the same as the shape of the first rib 116. That is, the length and width of the second and third ribs 118, 120 are substantially equal to the length and width of the first rib 116. In addition, the second and third ribs 118, 120 each include a rounded leading edge, a rounded trailing edge, and rounded side edges. However, it should be appreciated that in certain embodiments, the shape/configuration of the second rib 118 and/or the third rib 120 may be different than the shape/configuration of the first rib 116. For example, in certain embodiments, the width of the second rib 118 and/or the third rib 120 may be different than the width of the first rib 116. For example, the width of each rib may be selected such that the rib is as wide as possible without contacting one of the baffles or a side of the plenum body. In addition, the length of the second rib 118 and/or the third rib 120 may be different than the length of the first rib 116.

In the illustrated embodiment, the second rib 118 is oriented at an angle 132 relative to the longitudinal axis/centerline 72. In addition, the third rib 120 is orientated at an angle 134 relative to the longitudinal axis/centerline 72. The angles 132 and 134 may be particularly selected such that the effect of the ribs on the air flow through the plenum is substantially reduced. For example, each rib may be substantially oriented in the direction of the air flow proximate to the respective rib. Such an orientation may substantially reduce the pressure loss proximate to the rib, thereby substantially maintaining the flow characteristics at the outlet ports 56. By way of example, the angles 132 and 134 may be about 2 degrees, about 4 degrees, about 6 degrees, about 10 degrees, about 45 degrees, or more. By way of further example, the angles 132 and 134 may be about 1 to 45 degrees, about 2 to 30 degrees, about 3 to 20 degrees, or about 4 to 10 degrees. While the angles 132 and 134 are equal to one another in the illustrated embodiment, it should be appreciated that the angles 132 and 134 may be different from one another in alternative embodiments (e.g., based on the direction of the air flow proximate to each rib). In addition, it should be appreciated that the first rib 116 may be oriented at an angle relative to the longitudinal axis/centerline 72 in certain embodiments.

While the ribs are substantially aligned with one another along the longitudinal axis/centerline 72, it should be appreciated that one or more ribs may be offset from one or more other ribs along the longitudinal axis/centerline 72. Furthermore, in the illustrated embodiment, the ribs 116, 118, 120 protrude outwardly from the top element 66. However, it should be appreciated that in certain embodiments, one or more ribs may protrude inwardly into an interior of the plenum body 50. In such embodiments, the rib(s) may guide the airflow toward the outlet ports 56 and/or toward the pressurization port 80. Furthermore, while the ribs extend perpendicularly to the top element 66, it should be appreciated that in certain embodiments, the ribs may extend outwardly or inwardly from the top element at an angle. Moreover, it should be appreciated that ribs (e.g., 1, 2, 3, 4, or more) may be formed on the first side 62 and/or the second side 64 of the plenum body 50, and/or on the face element 60. While the illustrated embodiment includes integrally molded ribs, it should be appreciated that in certain embodiments, separately formed ribs may be coupled to the plenum body 50.

Figure 12:
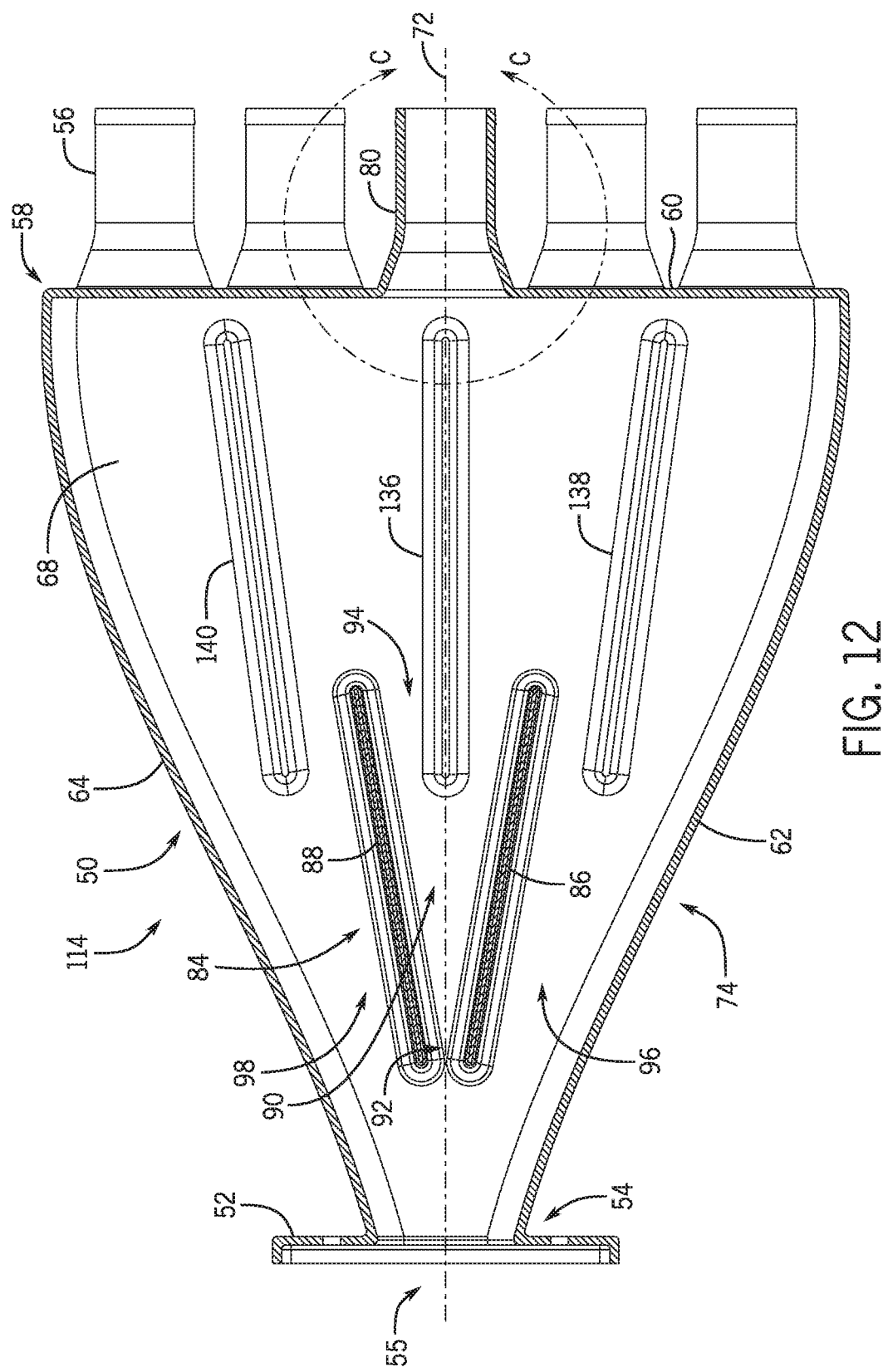
FIG. 12 is a cross-sectional top view of the plenum of FIG. 10, taken along line B-B of FIG. 10.

FIG. 12 is a cross-sectional top view of the plenum 114 of FIG. 10, taken along line B-B of FIG. 10. In the illustrated embodiment, three ribs 136, 138, 140 are formed on the bottom element 68 of the plenum body 50. The shape/configuration of each rib of the bottom element is substantially the same as the shape/configuration of each rib of the top element. That is, the length and width of each rib of the bottom element are substantially equal to the length and width of each rib of the top element. Moreover, each rib of the bottom element includes a rounded lead edge, a rounded trailing edge, and rounded side edges. In addition, an angle of each rib of the bottom element is substantially equal to the angle of the corresponding rib of the top element. For example, the fourth rib 136 is substantially aligned with the longitudinal axis/centerline 72, an angle of the fifth rib 138 relative to the longitudinal axis/centerline 72 is substantially equal to the angle 132 of the second rib 118, and an angle of the sixth rib 140 relative to the longitudinal axis/centerline 72 is substantially equal to the angle 134 of the third rib 120. In addition, the position of each rib 136, 138, 140 relative to the bottom element 68 is substantially equal to the position of each rib 116, 118, 120 relative to the top element 66. Accordingly, the first rib 116 and the fourth rib 136 are symmetrical relative to the longitudinal axis/centerline 72, the second rib 118 and the fifth rib 138 are symmetrical relative to the longitudinal axis/centerline 72, and the third rib 120 and the sixth rib 140 are symmetrical relative to the longitudinal axis/centerline 72. Furthermore, the ribs 136, 138, 140 protrude outwardly from the bottom element 68, and the ribs 136, 138, 140 are integrally formed with the plenum body (e.g., via a rotational molding process).

In certain embodiments, the shape/configuration of one or more ribs of the bottom element may be different than the shape/configuration of one or more ribs of the top element. For example, the length and/or width of one or more ribs of the bottom element may be different than the length and/or width of one or more ribs of the top element. In addition, an angle of one or more ribs of the bottom element may be different than the angle of the corresponding rib(s) of the top element. In addition, the position of one or more ribs 136, 138, 140 relative to the bottom element 68 may be different than the position of the corresponding rib(s) relative to the top element 66. Furthermore, in certain embodiments, one or more ribs 136, 138, 140 may protrude inwardly from the bottom element 68, thereby extending into the interior of the plenum body 50. Furthermore, while the ribs extend perpendicularly to the bottom element 68, it should be appreciated that in certain embodiments, the ribs may extend outwardly or inwardly from the bottom element at an angle. While the illustrated bottom element 68 includes three ribs, it should be appreciated that in alternative embodiments, the bottom element 68 may include more or fewer ribs. For example, in certain embodiments, the bottom element 68 may include more or fewer ribs than the top element 66.

Figure 13:
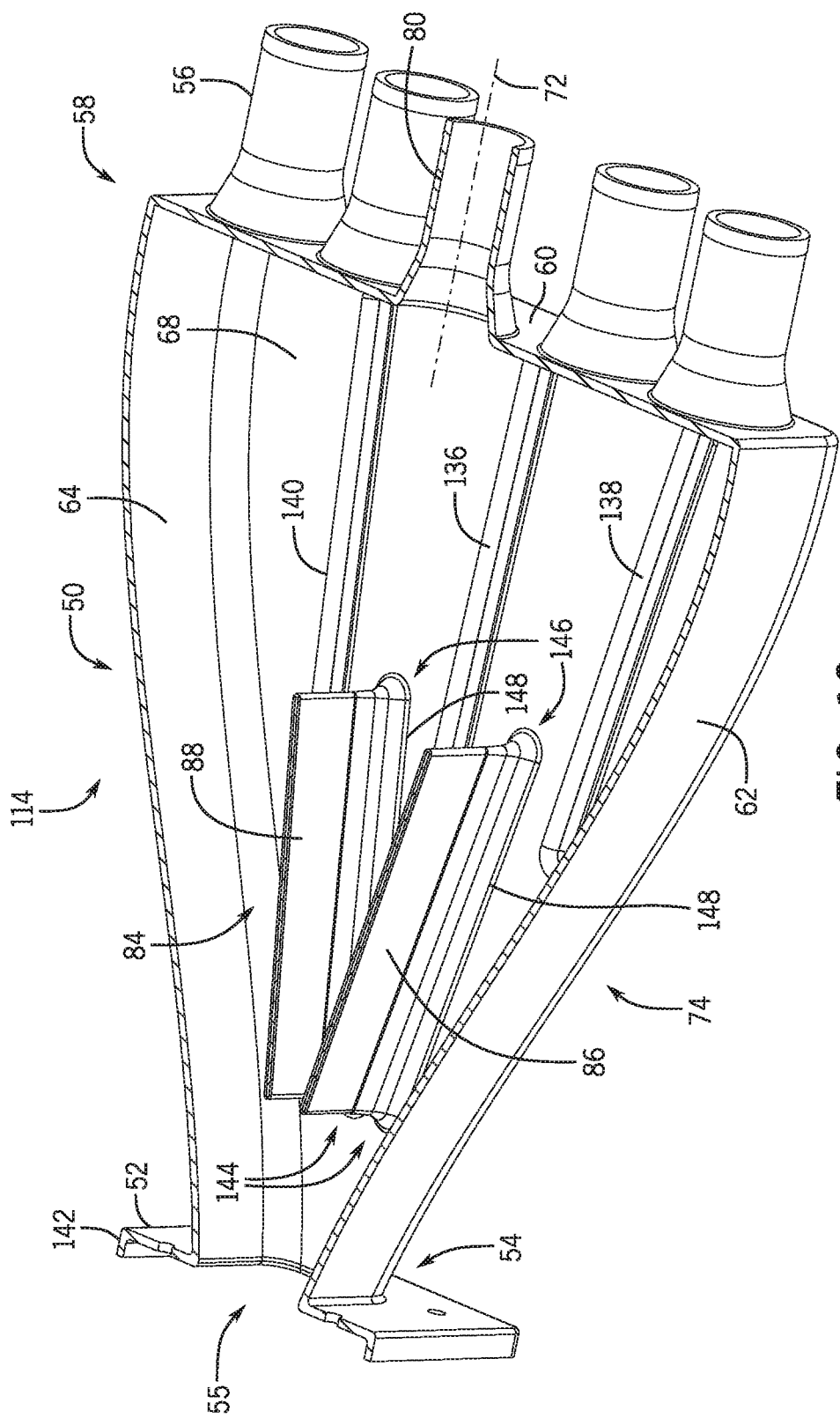
FIG. 13 is a cross-sectional perspective view of the plenum of FIG. 10, taken along line B-B of FIG. 10.

FIG. 13 is a cross-sectional perspective view of the plenum of FIG. 10, taken along line B-B of FIG. 10. As previously discussed, the plenum body 50, the flange 52, the outlet ports 56, the pressurization port 80, and the ribs 116, 118, 120, 136, 138, 140 are formed from a single piece of material (e.g., via a rotational molding process). In the illustrated embodiment, the flange 52 includes a projection 142 that extends about a periphery of the flange 52. The projection 142 is configured to enhance the structural rigidity of the flange 52, thereby substantially reducing air leakage between the flange 52 and the air source.

In the illustrated embodiment, the first baffle 86 and the second baffle 88 are integrally formed with the plenum body 50 (e.g., via the rotational molding process, via an injection molding process, via a casting process, etc.). Accordingly, the plenum body 50, the flange 52, the outlet ports 56, the pressurization port 80, the ribs 116, 118, 120, 136, 138, 140, and the baffles 86 and 88 may be formed from a single piece of material (e.g., polymeric material, metal material). As a result, the manufacturing cost of the plenum 114 may be significantly reduced, as compared to plenums formed by coupling multiple separately formed components to one another. In certain embodiments, the baffles 86, 88 are formed around an element of a mold/tool during a rotational molding process. In such embodiments, the element is removed from the baffles 86, 88 as the plenum 114 is released from the mold/tool. In certain embodiments, plates may be inserted into the rotationally molded baffles to increase the structural rigidity of the baffles. In alternative embodiments, the baffles 86, 88 are formed around respective plates (e.g., metal plates) during the rotational molding process. In such embodiments, the plates remains embedded in the baffles 86, 88, thereby enhancing the structural rigidity of the baffles 86, 88. In the illustrated embodiment, each baffle 86, 88 includes a rounded leading edge 144, a rounded trailing edge 146, and rounded side edges 148. The rounded edges may substantially reduce the pressure loss of the air flow through the plenum 114, thereby substantially maintaining the flow characteristics at the outlet ports 56. In the illustrated embodiment, the baffles 86, 88 extend substantially perpendicularly to the top and bottom element 66, 68. However, it should be appreciated that in certain embodiments, the baffles may be angled relative to the top element 66 and/or the bottom element 68.

Figure 14:
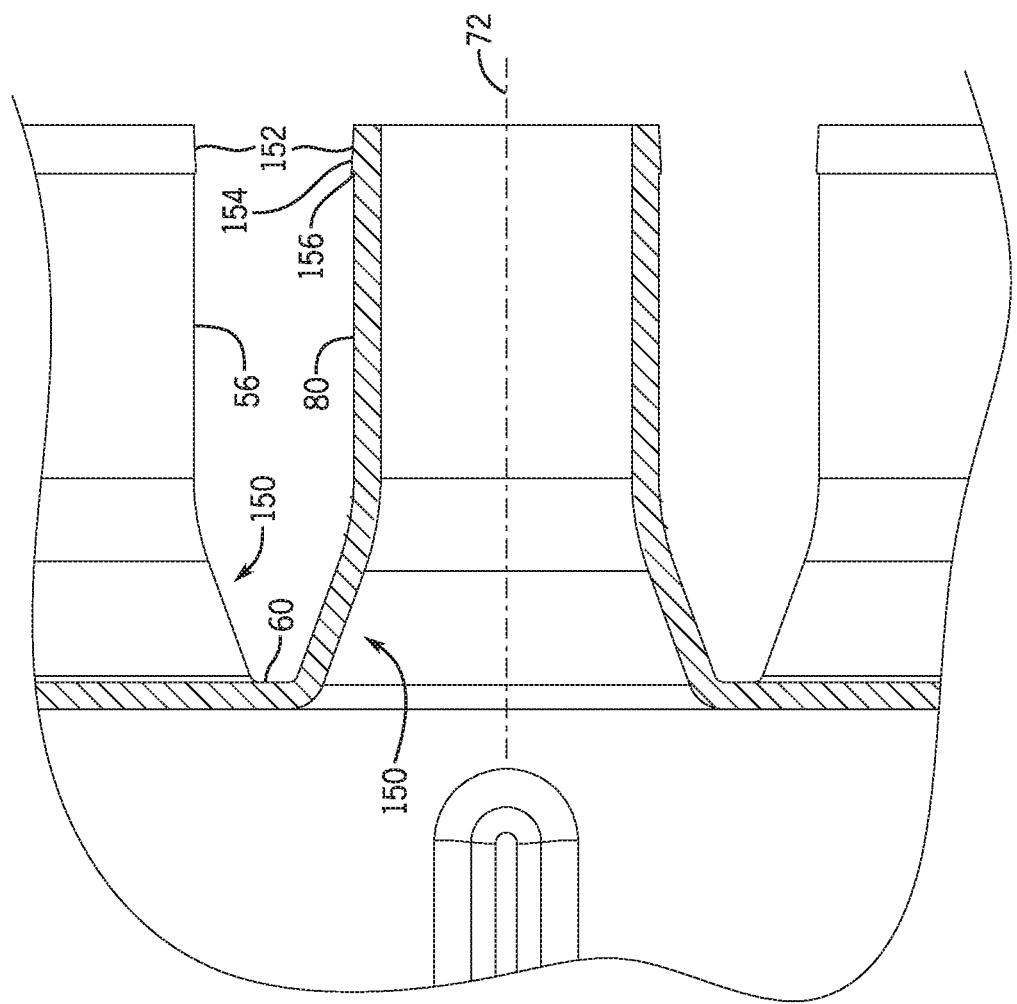
FIG. 14 is a detailed cross-sectional view of the plenum of FIG. 10, taken within line C-C of FIG. 12.

FIG. 14 is a detailed cross-sectional view of the plenum of FIG. 10, taken within line C-C of FIG. 12. As illustrated, a rounded transition 150 extends between the face element 60 and the pressurization outlet 80. The rounded transition is configured to reduce the pressure drop of the air flow from the plenum body 50 to the pressurization outlet 80, thereby maintaining the flow characteristics at the pressurization port. The configuration (e.g., radius of curvature, length, profile, initial diameter, etc.) may be particularly configured for the expected flow through the plenum 114. In the illustrated embodiment, rounded transitions 150 also extend between the face element 60 and respective outlet ports 56. In certain embodiments, the rounded transitions at the outlet ports 56 may be substantially the same as the rounded transition at the pressurization port 80. However, in alternative embodiments, each outlet port rounded transition may have a different configuration (e.g., radius of curvature, length, profile, initial diameter, etc.) than the pressurization port rounded transition. Furthermore, in certain embodiments, certain outlet port rounded transitions may differ from one another based on the expected flow into the respective outlet ports 56.

In the illustrated embodiment, the outlet ports 56 and the pressurization port 80 each include a barb 152 at the distal end of the respective port. Each barb 152 is configured to facilitate retention of a hose on the respective port. As illustrated, each barb 152 includes an angled portion 154 configured to enable a hose to engage the outlet port 56 or the pressurization port 80. Once the hose is engaged with the respective port, a hose clamp may be positioned around the hose between a proximal end of the port and the barb 152 (e.g., between the barb 152 and the rounded transition 150). The hose clamp may then be tightened to compress the hose such that the inner diameter of the hose is less than the maximum diameter of the barb. As a result, movement of the hose away from the port may be blocked by contact between the hose and a retaining surface 156 of the barb. Accordingly, the hose may remain coupled to the port during operation of the air cart and implement. In certain embodiments, the height of the retaining surface 156 (i.e., the radial extent of the retaining surface beyond the outer surface of the port) may be particularly selected such that the hose clamp may be tightened to a degree that enables the hose to rotate about the port while blocking movement of the hose away from the port. While each port in the illustrated embodiment includes one barb, it should be appreciated that certain ports may include more or fewer barbs. For example, in certain embodiments, certain ports may include 0, 1, 2, 3, 4, or more barbs. Moreover, while each illustrated barb includes an angled portion and a retaining surface, it should be appreciated that other barb shapes (e.g., arcuate, polygonal, etc.) may be utilized in alternative embodiments.

Figure 15:
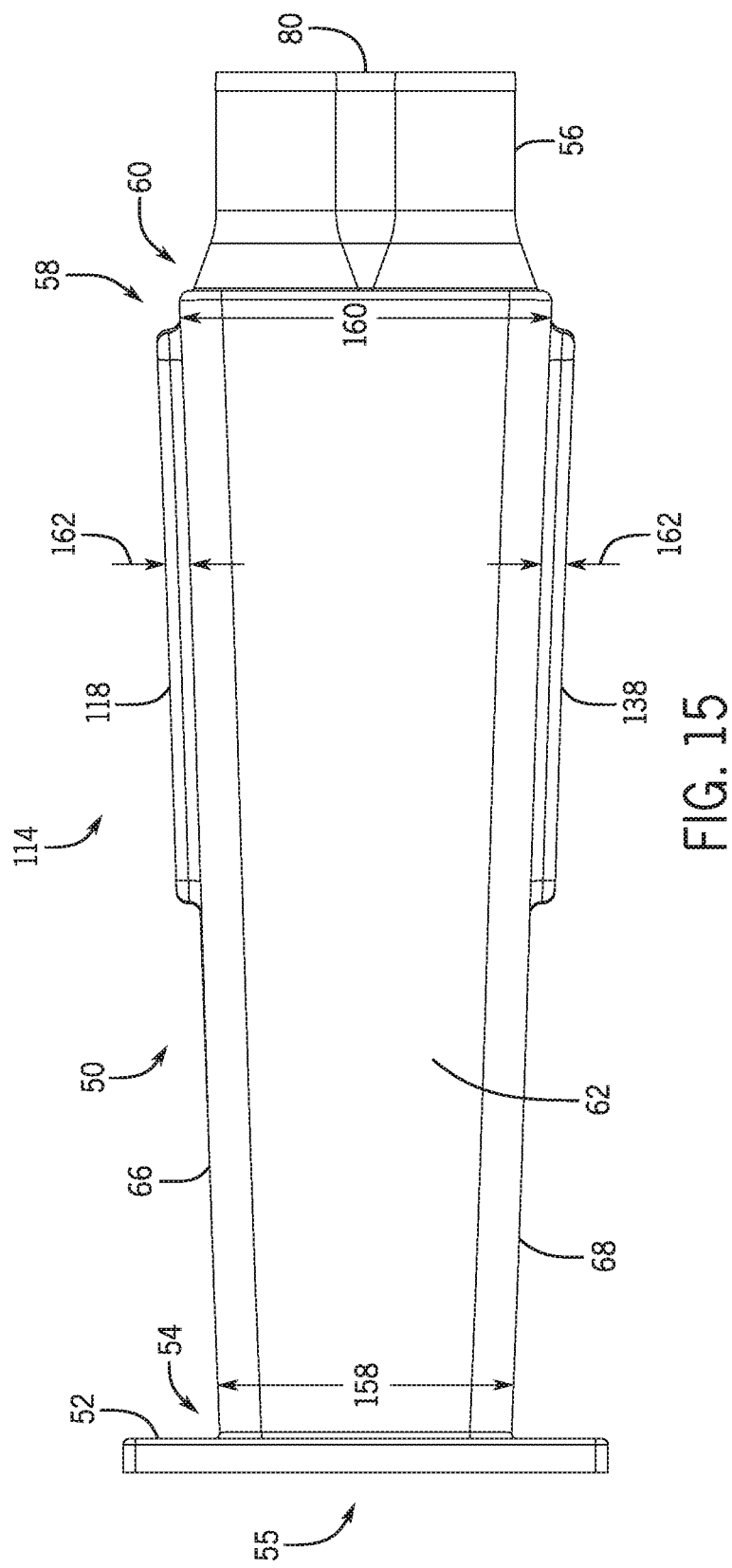
FIG. 15 is a side view of the plenum of FIG. 10.

FIG. 15 is a side view of the plenum of FIG. 10. As illustrated, the body 50 of the plenum 114 expands vertically from the first end 54 to the second end 58. The vertical expansion increases the cross-sectional area of the plenum body 50 from the inlet 55 to the outlet ports 56 and the pressurization port 80. As a result, the velocity of the air flow decreases and the pressure of the airflow increases as the air flows from the inlet 55 to the ports 56, 80. As illustrated, a first height 158 of the plenum body 50 at the first end 54 (e.g., at the inlet 55) is less than a second height 160 of the plenum body 50 at the second end 58 (e.g., at the face element 60). For example, in certain embodiments, the second height 160 may be about 10 percent, about 20 percent, about 25 percent, about 27 percent, about 28 percent, about 30 percent, about 40 percent, about 50 percent, or more larger that the first height 158. By way of further example, the second height 160 may be about 5 to 75 percent, about 10 to 60 percent, about 15 to 50 percent, or about 27 to 28 percent larger than the first height 158. In certain embodiments, the second height 160 may be about 27.7 percent larger than the first height 158. In alternative embodiments, the first height 158 may be substantially equal to the second height 160. In further embodiments (e.g., in embodiments in which a single row of outlet ports extends along the face element), the first height may be greater than the second height, thereby establishing a converging plenum body.

As previously discussed, each rib is particularly shaped to reduce the effect of the rib on the flow characteristics at the outlet ports 56. Accordingly, a height 162 of each rib may be particularly selected to reduce the pressure drop of the air flow proximate to the rib, thereby substantially maintaining the flow characteristics at the outlet ports 56. For example, in certain embodiments, the height 162 of each rib may be about 1 percent, about 2 percent, about 3 percent, about 5 percent, about 6 percent, about 7 percent or more of the second height 160. By way of example, the height 162 of each rib may be about 1 to 10 percent, about 2 to 8 percent, about 3 to 7 percent, or about 6 to 7 percent of the second height 160. In certain embodiments, the height 162 of certain ribs may be about 6.5 percent of the second height 160. In the illustrated embodiment, the height of each rib is substantially equal. However, it should be appreciated that one or more ribs may have different heights in alternative embodiments.

One or more features described above with reference to FIGS. 10-15 (e.g., the ribs, the one-piece plenum configuration, the vertical expansion of the plenum body along the longitudinal axis, the rounded transitions to the outlet ports and pressurization port, and the barbs on the outlet ports and the pressurization port) may be omitted from the plenum 114 in certain embodiments. In addition, one or more of the features described above with reference to FIGS. 10-15 may be included in the plenum 36 described above with reference to FIGS. 3-6.

While the plenums 36 and 114 are described with reference to a seeder, it should be appreciated that the plenums may be used on other agricultural equipment to facilitate distribution of an air flow. For example, one or more of the plenums described above with reference to FIGS. 3-6 and FIG. 10-15 may be employed to distribute an air flow on fertilizer application equipment, planters, and cotton pickers, among other agricultural equipment. In such applications, the pressurization port of the plenum may be omitted.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a tank configured to store an agricultural product for distribution by an agricultural implement;
   a plenum, comprising:
      a body having an inlet configured to receive a flow of air from an air source and a face element;
      a pressurization port extending from the face element; and
      a plurality of outlet ports extending from the face element, wherein each outlet port of the plurality of outlet ports is configured to direct the flow of air from the outlet port to the agricultural implement; and
   a pressurization line extending from the pressurization port to the tank, wherein the pressurization line is configured to direct the entire flow of air from the pressurization port to the tank.

2. The system of claim 1, wherein the plenum comprises a baffle assembly disposed within the body.

3. The system of claim 2, wherein the baffle assembly is positioned symmetrically about a longitudinal centerline of the plenum.

4. The system of claim 1, wherein the body, the pressurization port, and the plurality of outlet ports are formed from a single piece of material.

5. The system of claim 4, wherein the plenum comprises at least one baffle disposed within the body, and the at least one baffle, the body, the pressurization port, and the plurality of outlet ports are formed from the single piece of material.

6. The system of claim 1, wherein the pressurization port is laterally centered on the face element.

7. The system of claim 1, wherein the plurality of outlet ports are positioned symmetrically on opposite lateral sides of the pressurization port.

8. The system of claim 1, wherein the inlet is positioned at a first end of the body, and the face element is positioned at a second end of the body, opposite the first end.

9. The system of claim 1, wherein the plenum has a first width at the inlet and a second width at the face element, and the first width is smaller than the second width.

10. The system of claim 1, wherein the plenum comprises at least one rib integrally formed on a wall of the body.

11. The system of claim 1, wherein the plenum comprises a rounded transition between the face element and at least one outlet port of the plurality of outlet ports or the pressurization port.

12. A system, comprising:
   an air source configured to supply a flow of air;
   a tank configured to store an agricultural product for distribution by an agricultural implement;
   a metering system configured to regulate a flow of the agricultural product from the tank to the agricultural implement via a plurality of distribution hoses; and
   a plenum fluidly coupled to the air source, comprising:
      a body having an inlet configured to receive the flow of air from the air source and a face element;
      a pressurization port extending from the face element and configured to direct the flow of air to the tank via a pressurization line, wherein the pressurization port is laterally centered on the face element; and
      a plurality of outlet ports extending from the face element, wherein each outlet port of the plurality of outlet ports is configured to direct the flow of air to the agricultural implement via a respective distribution hose of the plurality of distribution hoses.

13. The system of claim 12, wherein the plenum comprises a baffle assembly disposed within the body, and the baffle assembly is configured to control the flow of air through the plenum.

14. The system of claim 13, wherein the baffle assembly comprises at least one baffle, and wherein an orientation of the at least one baffle, a position of the at least one baffle, or a combination thereof, is adjustable.

15. The system of claim 12, wherein a first width of the plenum at the inlet is less than a second width of the plenum at the face element.

16. A system, comprising:
   a tank configured to store an agricultural product for distribution by an agricultural implement;
   a plenum configured to distribute a flow of air from an air source, comprising:
      a body having an inlet and a face element, wherein the inlet is configured to receive the flow of air from the air source, and the face element has a rectangular shape;
      a plurality of outlet ports extending from the face element, wherein each outlet port of the plurality of outlet ports is configured to direct the flow of air from the outlet port to the agricultural implement; and
      a pressurization port extending from the face element;
      wherein the plurality of outlet ports and the pressurization port are arranged on the face element in three rows; and
   a pressurization line extending from the pressurization port to the tank, wherein the pressurization line is configured to direct the entire flow of air from the pressurization port to the tank.

17. The system of claim 16, wherein the pressurization port is laterally centered on the face element.

18. The system of claim 16, wherein the inlet is positioned at a first end of the body, and the face element is positioned at a second end of the body, opposite the first end.

19. The system of claim 16, wherein the plenum comprises a baffle assembly disposed within the body and configured to control the flow of air through the plenum.

20. The system of claim 16, wherein the pressurization port is positioned in a middle row of the three rows.

* * * * *